US012794271B2

(12) United States Patent
Ha et al.

(10) Patent No.: US 12,794,271 B2
(45) Date of Patent: Nov. 10, 2026

(54) ELECTRONIC DEVICE FOR WIRELESS POWER TRANSMISSION AND RECEPTION AND OPERATION METHOD OF SAME

(71) Applicant: Samsung Electronics Co., Ltd., Suwon-si (KR)

(72) Inventors: Mincheol Ha, Suwon-si (KR); Dongzo Kim, Suwon-si (KR); Kyungwoo Lim, Suwon-si (KR); Hyungkoo Chung, Suwon-si (KR); Hanshil Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/045,202

(22) Filed: Feb. 4, 2025

(65) Prior Publication Data

US 2025/0183717 A1 Jun. 5, 2025

Related U.S. Application Data

(63) Continuation of application No. PCT/KR2023/008009, filed on Jun. 12, 2023.

(30) Foreign Application Priority Data

Aug. 9, 2022 (KR) ........................ 10-2022-0099088
Aug. 31, 2022 (KR) ........................ 10-2022-0109676

(51) Int. Cl.
*H02J 50/12* (2016.01)
*H02J 50/90* (2016.01)
(Continued)

(52) U.S. Cl.
CPC .............. *H02J 50/12* (2016.02); *H02J 50/90* (2016.02); *H02J 7/82* (2026.01); *H02J 50/80* (2016.02); *H04M 2250/12* (2013.01)

(58) Field of Classification Search
CPC ................ H02J 50/10–12; H02J 50/90; B60L 53/12–126; H04M 2250/12
See application file for complete search history.

(56) References Cited

U.S. PATENT DOCUMENTS

2013/0225077 A1 8/2013 Schultz et al.
2015/0311955 A1 10/2015 Lu et al.
(Continued)

FOREIGN PATENT DOCUMENTS

EP 4187756 A1 5/2023
JP 2014/052675 A 3/2014
(Continued)

OTHER PUBLICATIONS

European Search report dated Oct. 29, 2025, issued in European Application No. 23852703.0.
(Continued)

*Primary Examiner* — Rexford N Barnie
*Assistant Examiner* — David A Shiao
(74) *Attorney, Agent, or Firm* — Jefferson IP Law, LLP

(57) ABSTRACT

An electronic device is provided. The electronic device includes a converter that is configured to perform a direct current (DC)/DC power conversion operation, a power conversion circuit that is electrically or operatively connected to the converter and configured to perform an alternating current (AC)/DC power conversion, a coil electrically or operatively connected to the power conversion circuit, a motion sensor that is configured to detect a motion of the electronic device, memory storing one or more computer programs and one or more processors communicatively coupled to the memory and the converter, the power conversion circuit, or the motion sensor, wherein the one or more computer programs include computer-executable instructions that, when executed by the one or more proces-
(Continued)

sors individually or collectively, cause the electronic device to identify an impedance variation at at least one point in the electronic device, identify a motion variation in the electronic device through the motion sensor based on the impedance variation exceeding a first reference value, set a delay time on the basis that the motion variation is greater than a second reference value, and transmit first driving power to an external electronic device via the coil according to an elapse of the delay time.

20 Claims, 9 Drawing Sheets

(51) Int. Cl.
*H02J 7/82* (2026.01)
*H02J 50/80* (2016.01)

(56) References Cited

U.S. PATENT DOCUMENTS

2016/0028269 A1 1/2016 Miller et al.
2016/0190861 A1 6/2016 Cha
2016/0238731 A1* 8/2016 Chopra .................... H02J 50/12
2016/0301218 A1 10/2016 Cho et al.
2016/0315481 A1 10/2016 Lee et al.
2017/0317536 A1* 11/2017 Marson .................... H02J 50/10
2018/0041622 A1 2/2018 Park et al.
2018/0085593 A1* 3/2018 Fayram ................ A61N 1/0551
2018/0166922 A1 6/2018 Chung
2018/0233964 A1 8/2018 Sengupta et al.
2018/0301939 A1* 10/2018 Byun ...................... H02J 50/12
2021/0167631 A1 6/2021 Sato et al.
2021/0184515 A1* 6/2021 Jaakkola ................. H02J 7/342
2021/0376668 A1 12/2021 Lee et al.
2022/0006327 A1 1/2022 Mehrabi et al.
2022/0006329 A1* 1/2022 AbuKhalaf ............. H02J 50/40
2023/0059432 A1* 2/2023 Shi .......................... H02J 50/80

FOREIGN PATENT DOCUMENTS

JP 2018/121504 A 8/2018
KR 10-2013-0119938 A 11/2013
KR 10-2016-0077695 A 7/2016
KR 10-2016-0121220 A 10/2016
KR 10-2016-0126312 A 11/2016
KR 10-1844283 B1 4/2018
KR 10-2018-0058557 A 6/2018
KR 10-2018-0067238 A 6/2018
KR 10-2018-0086381 A 7/2018
KR 10-2019-0128926 A 11/2019
KR 10-2021-0089906 A 7/2021
KR 10-2022-0021093 A 2/2022
WO 2010/085703 A1 7/2010
WO 2012/027166 A1 3/2012
WO 2019/117140 A1 6/2019
WO 2021/084517 A1 5/2021

OTHER PUBLICATIONS

International Search Report and writtine opinion dated Sep. 12, 2023, issued in International Application No. PCT/KR2023/008009.

* cited by examiner

ELECTRONIC DEVICE FOR WIRELESS POWER TRANSMISSION AND RECEPTION AND OPERATION METHOD OF SAME

CROSS-REFERENCE TO RELATED APPLICATION(S)

This application is a continuation application, claiming priority under 35 U.S.C. § 365 (c), of an International application No. PCT/KR2023/008009, filed on Jun. 12, 2023, which is based on and claims the benefit of a Korean patent application number 10-2022-0099088, filed on Aug. 9, 2022, in the Korean Intellectual Property Office, and of a Korean patent application number 10-2022-0109676, filed on Aug. 31, 2022, in the Korean Intellectual Property Office, the disclosure of each of which is incorporated by reference herein in its entirety.

BACKGROUND

1. Field

The disclosure relates to electronic devices wirelessly receiving power and methods for operating the same.

2. Description of Related Art

The wireless power transmission technology using the magnetic induction scheme is a scheme for transferring power by the electromagnetic field induced in the coil. The wireless power transmission device applies a current to the transmission coil to generate an electromagnetic field, and an induced electromotive force is formed in the reception coil of the wireless power receiving device, so that power may be wirelessly transmitted.

An electronic device 400 (e.g., a wireless power transceiver) wirelessly transmitting/receiving power may wirelessly transmit power to another electronic device or wirelessly receive power from the other electronic device. The electronic device wirelessly transmitting and receiving power may be implemented to transmit or receive power using one coil. The electronic device wirelessly transmitting and receiving power may perform an operation for wirelessly transmitting power to another electronic device in transmission mode. The electronic device wirelessly transmitting and receiving power may perform an operation for wirelessly receiving power from another electronic device in reception mode.

The electronic device wirelessly transmitting and receiving power may determine whether to operate in transmission mode or reception mode based on a user setting of the electronic device, an input through a physical button of the electronic device, identification of information through a hall IC, or a signal through out-band communication so as to operate in transmission mode or reception mode.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide electronic devices wirelessly receiving power and methods for operating the same.

Additional aspects will be set forth in part in the description which follows and, in part, will be apparent from the description, or may be learned by practice of the presented embodiments.

In accordance with an aspect of the disclosure, an electronic device is provided. The electronic device includes a converter configured to perform a direct current (DC)/DC power conversion operation, a power conversion circuit electrically or operatively connected to the converter and configured to perform an alternating current (AC)/DC power conversion operation, a coil electrically or operatively connected to the power conversion circuit, a motion sensor configured to detect a motion of the electronic device, memory storing one or more computer programs, and one or more processors communicatively coupled to the memory and the converter, the power conversion circuit, or the motion sensor, wherein the one or more computer programs include computer-executable instructions that, when executed by the one or more processors individually or collectively, cause the electronic device to identify an impedance variation at at least one point in the electronic device, identify a motion variation in the electronic device through the motion sensor based on the impedance variation exceeding a first reference value, set a delay time based on the motion variation exceeding a second reference value, and transmit first driving power to an external electronic device through the coil according to an elapse of the delay time.

In accordance with another aspect of the disclosure, a method performed by an electronic device is provided. The method includes identifying an impedance variation at at least one point in the electronic device, identifying a motion variation in the electronic device through a motion sensor of the electronic device based on the impedance variation exceeding a first reference value, setting a delay time based on the motion variation exceeding a second reference value, and transmitting first driving power to an external electronic device through a coil of the electronic device according to an elapse of the delay time.

In accordance with another aspect of the disclosure, one or more non-transitory computer-readable storage media storing one or more computer programs including computer-executable instructions that, when executed by one or more processors of an electronic device individually or collectively, cause the electronic device to perform operations, is provided. The one or more operations include identifying an impedance variation at at least one point in the electronic device, identifying a motion variation in the electronic device through a motion sensor of the electronic device based on the impedance variation exceeding a first reference value, setting a delay time based on the motion variation exceeding a second reference value, and transmitting first driving power to an external electronic device through a coil of the electronic device according to an elapse of the delay time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
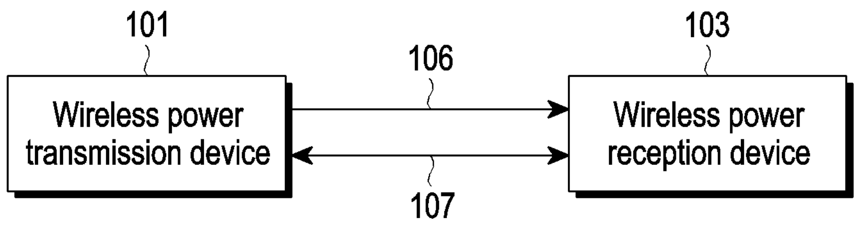
FIG. 1 is a block diagram illustrating a wireless power transmission device and a wireless power reception device according to an embodiment of the disclosure.

FIG. 1 is a block diagram illustrating a wireless power transmission device and a wireless power reception device according to an embodiment of the disclosure.

Referring to FIG. 1, a wireless power transmission device 101 according to an embodiment may wirelessly transmit power 106 to a wireless power reception device 103. Or, the wireless power transmission device 101 may receive information 107 from the wireless power reception device 103. For example, the wireless power transmission device 101 may transmit power 106 as per an induction scheme. Adopting the induction scheme, the wireless power transmission device 101 may include at least one of, e.g., a power source, a DC-DC conversion circuit (e.g., DC/DC converter), DC-AC conversion circuit (e.g., inverter), an amplifying circuit, an impedance matching circuit, at least one capacitor, at least one coil, or a communication modulation circuit. The at least one capacitor together with the at least one coil may constitute a resonance circuit. The wireless power transmission device 101 may implement at least part of the schemes defined in the wireless power consortium (WPC) Qi standard. The wireless power transmission device 101 may include a coil that is capable of produce a magnetic field when letting an electric current flow thereacross by an induction scheme. The operation of the wireless power transmission device 101 producing an induced magnetic field may be represented as the wireless power transmission device 101 wirelessly transmitting the power 106. Further, an induced electromotive force (or current, voltage, and/or power) may be generated by the magnetic field generated around the coil of the wireless power reception device 103 according to a resonance scheme or an induction scheme. The process of producing an induced electromotive force through the coil may be represented as the 'wireless power reception device 103 wirelessly receives the power 106.'

The wireless power transmission device 101 according to an embodiment may communicate with the wireless power reception device 103. For example, the wireless power transmission device 101 may communicate with the wireless power reception device 103 according to an in-band scheme. The wireless power transmission device 101 may modulate data to be transmitted according to, e.g., a frequency shift keying (FSK) modulation scheme, and the wireless power reception device 103 may perform modulation according to an amplitude shift keying (ASK) modulation scheme, thereby providing information 107. The wireless power transmission device 101 may identify the information 107 provided by the wireless power reception device 103 based on the amplitude of the current and/or voltage applied to the transmission coil. In FIG. 1, the wireless power reception device 103 is shown as directly transmitting the information 107 to the wireless power transmission device 101, but this is merely for an easy understanding, and it will be appreciated by one of ordinary skill in the art that that the wireless power reception device 103 only controls on/off of at least one switch therein. The operation of performing modulation based on an ASK modulation scheme and/or FSK modulation scheme may be understood as the operation of transmitting data (or packets) according to the in-band communication scheme, and the operation of performing demodulation based on the ASK demodulation scheme and/or FSK demodulation scheme may be understood as the operation of receiving data (or packets) according to the in-band communication scheme.

In the disclosure, that the wireless power transmission device 101 or the wireless power reception device 103 performs a specific operation may mean that various pieces of hardware included in the wireless power transmission device 101 or the wireless power reception device 103, e.g., a controller (e.g., a micro-controlling unit (MCU), a field programmable gate array (FPGA), an application specific integrated circuit (ASIC), a microprocessor, or an application processor (AP)) performs the specific operation. Or, that the wireless power transmission device 101 or the wireless power reception device 103 performs a specific operation may also mean that the connector controls another hardware device to perform the specific operation. That the wireless power transmission device 101 or the wireless power reception device 103 performs a specific operation may mean that the controller or another hardware device triggers the specific operation as an instruction for performing the specific operation, which is stored in a storage circuit (e.g., the memory of FIG. 3) of the wireless power transmission device 101 or the wireless power reception device 103, is executed.

Figure 2:
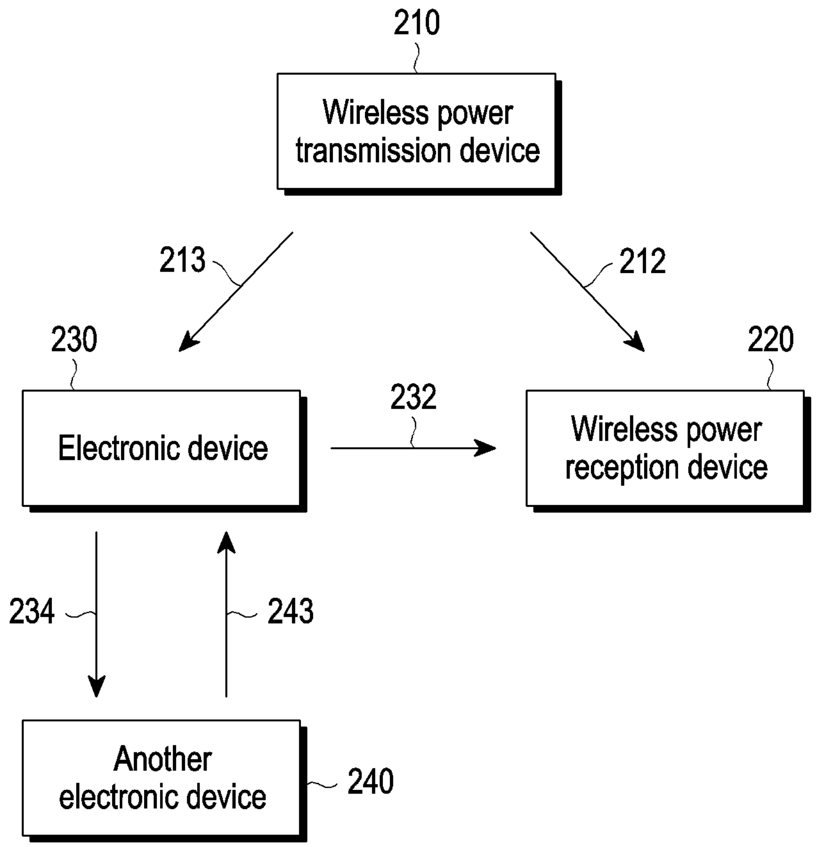
FIG. 2 is a view illustrating a device included in a wireless power transmission system, according to an embodiment of the disclosure.

FIG. 2 is a view illustrating a device included in a wireless power transmission system, according to an embodiment of the disclosure.

The wireless power transmission device 210 of FIG. 2 may be the wireless power transmission device 101 of FIG. 1. The wireless power reception device 220 of FIG. 2 may be the wireless power reception device 103 of FIG. 1. The wireless power transmission device 210 may wirelessly transmit power 212 to the wireless power reception device 220.

The electronic device 230 of FIG. 2 may be a device capable of operating as a wireless power transmission device (e.g., the wireless power transmission device 101 of FIG. 1) or as a wireless power reception device (e.g., the wireless power reception device 103 of FIG. 1).

According to an embodiment, the electronic device 230, as a wireless power reception device, may wirelessly receive power 213 from the wireless power transmission device 210. In this case, the description of the wireless power reception device 103 may be applied to the electronic device 230.

According to an embodiment, the electronic device 230, as a wireless power transmission device, may wirelessly transmit power 232 to the wireless power reception device 220. In this case, the description of the wireless power transmission device 101 may be applied to the electronic device 230.

The coil included in the electronic device 230 may be used as a reception coil as the electronic device 230 operates as a wireless power reception device, or may be used as a transmission coil as the electronic device 230 operates as a wireless power transmission device.

An AC-DC conversion circuit (e.g., a circuit operating as an inverter or a rectifier) included in the electronic device 230 may be used as a rectifier as the electronic device 230 operates as a wireless power reception device, or may be used as an inverter as the electronic device 230 operates as a wireless power transmission device.

The DC-DC conversion circuit (e.g., DC/DC converter) included in the electronic device 230 may be used as a reception converter as the electronic device 230 operates as a wireless power reception device, or may be used as a transmission converter as the electronic device 230 operates as a wireless power transmission device.

Other components included in the electronic device 230 may also operate for reception as the electronic device 230 operates as a wireless power reception device, and may operate for transmission as the electronic device 230 operates as a wireless power transmission device.

Figure 3:
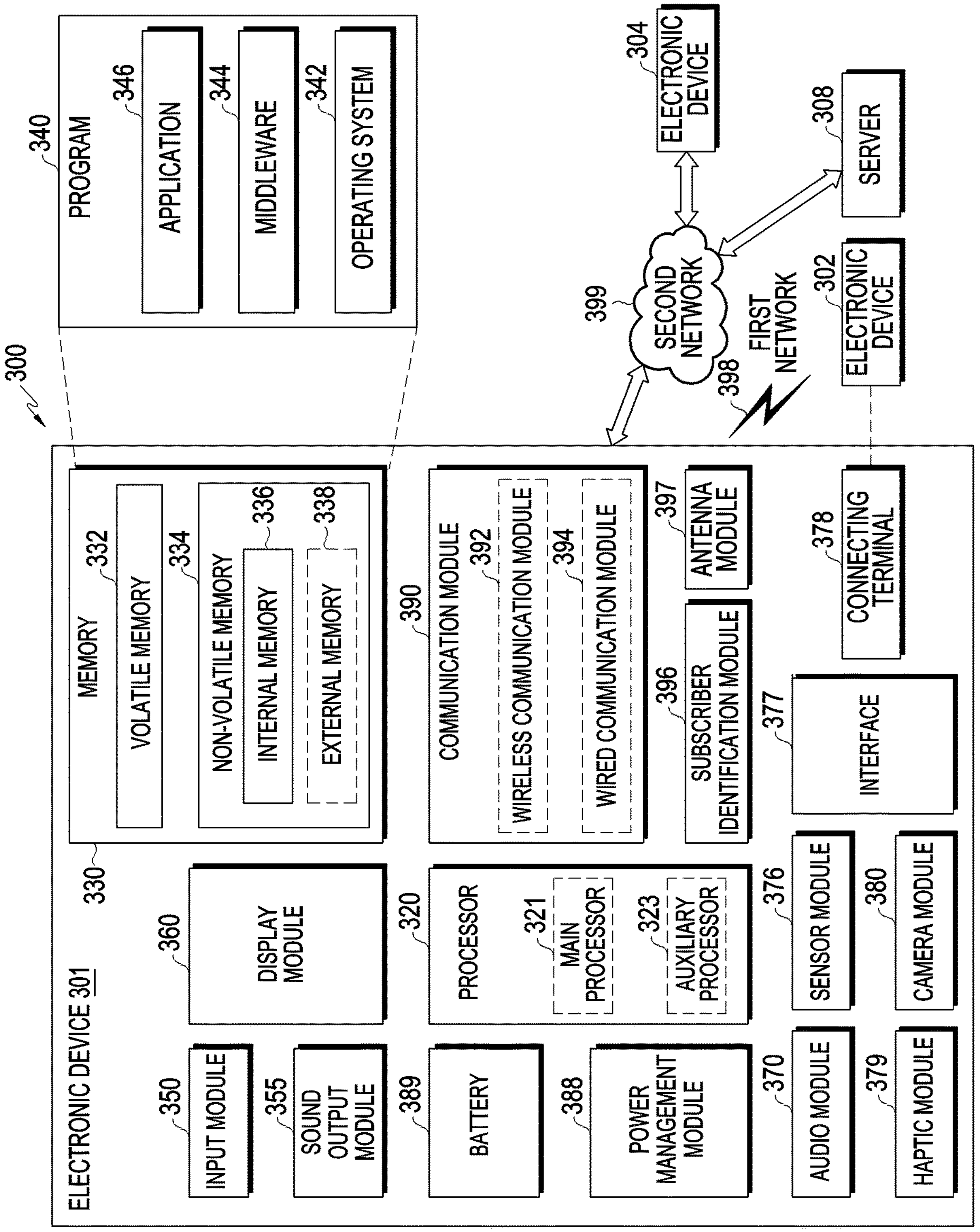
FIG. 3 is a block diagram illustrating an electronic device in a network environment according to an embodiment of the disclosure.

According to an embodiment, the electronic device 230 may be the electronic device 301 of FIG. 3.

Another electronic device 240 of FIG. 2 may be a device capable of operating as a wireless power transmission device (e.g., the wireless power transmission device 101 of FIG. 1) or as a wireless power reception device (e.g., the wireless power reception device 103 of FIG. 1).

The other electronic device 240 may be understood as similar to the electronic device 230. According to an embodiment, the other electronic device 240 may be the electronic device 302 of FIG. 3.

The electronic device 230 may wirelessly transmit power 234 to the other electronic device 240. The electronic device 230 may wirelessly receive power 243 from the other electronic device 240.

FIG. 3 is a block diagram illustrating an electronic device 301 in a network environment 300 according to an embodiment of the disclosure.

Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In an embodiment, at least one (e.g., the connecting terminal 378) of the components may be omitted from the electronic device 301, or one or more other components may be added in the electronic device 301. According to an embodiment, some (e.g., the sensor module 376, the camera module 380, or the antenna module 397) of the components may be integrated into a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be configured to use lower power than the main processor 321 or to be specified for a designated function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. According to an embodiment, the auxiliary processor 323 (e.g., the neural processing unit) may include a hardware structure specified for artificial intelligence model processing. The artificial intelligence model may be generated via machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by other component (e.g., the processor 320) of the electronic device 301, from the outside (e.g., a user) of the electronic device 301. The input module 350 may include, for example, a microphone, a mouse, a keyboard, keys (e.g., buttons), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 360 may visually provide information to the outside (e.g., a user) of the electronic device 301. The display 360 may include, for example, a display, a hologram device, or a projector and control circuitry to control a corresponding one of the display, hologram device, and projector. According to an embodiment, the display 360 may include a touch sensor configured to detect a touch, or a pressure sensor configured to measure the intensity of a force generated by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or motion) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device 304 via a first network 398 (e.g., a short-range communication network, such as Bluetooth™ wireless-fidelity (Wi-Fi) direct, or infrared data association (IrDA)) or a second network 399 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 392 may identify or authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device). According to an embodiment, the antenna module 397 may include one antenna including a radiator formed of a conductor or conductive pattern formed on a substrate (e.g., a printed circuit board (PCB)). According to an embodiment, the antenna module 397 may include a plurality of antennas (e.g., an antenna array). In this case, at least one antenna appropriate for a communication scheme used in a communication network, such as the first network 398 or the second network 399, may be selected from the plurality of antennas by, e.g., the communication module 390. The signal or the power may then be transmitted or received between the communication module 390 and the external electronic device via the selected at least one antenna. According to an embodiment, other parts (e.g., radio frequency integrated circuit (RFIC)) than the radiator may be further formed as part of the antenna module 397.

According to an embodiment, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 301 and the external electronic device 304 via the server 308 coupled with the second network 399. The external electronic devices 302 or 304 each may be a device of the same or a different type from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In another embodiment, the external electronic device 304 may include an Internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

Figure 4:
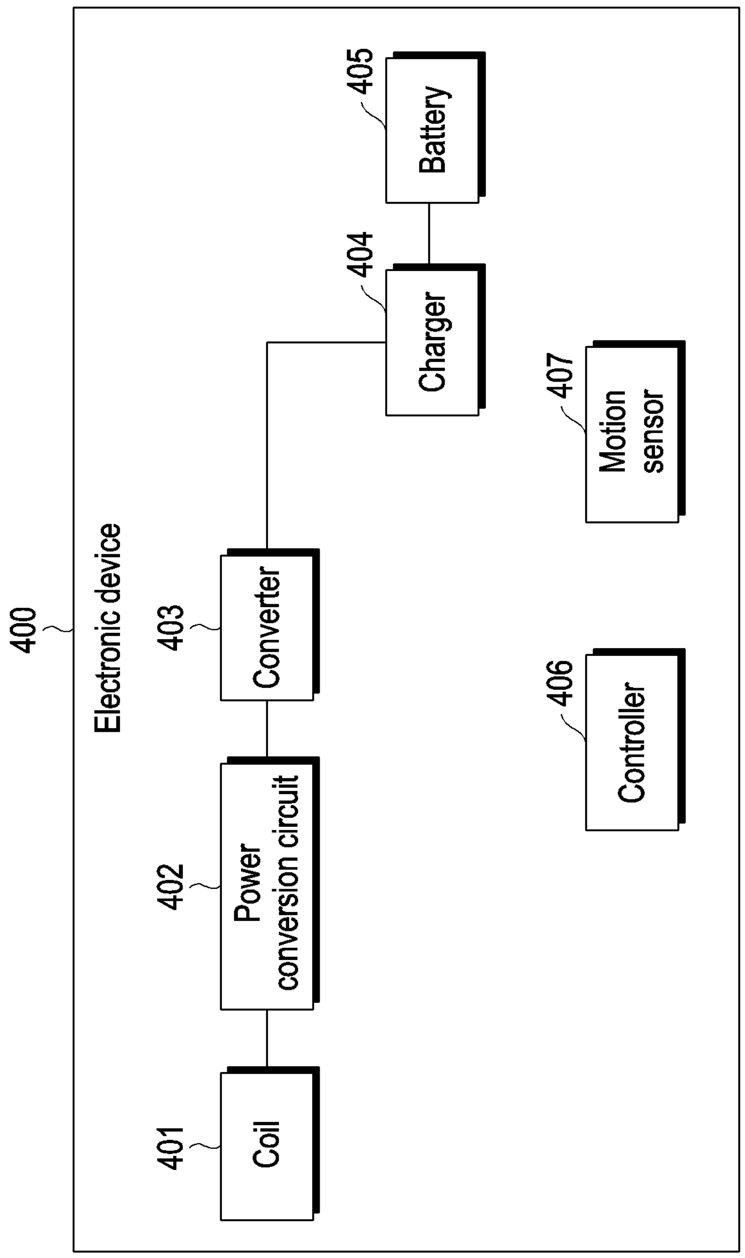
FIG. 4 is a block diagram illustrating an electronic device included in a wireless power transmission system according to an embodiment of the disclosure.

FIG. 4 is a block diagram illustrating an electronic device included in a wireless power transmission system according to an embodiment of the disclosure.

The electronic device 400 of FIG. 4 may be the electronic device 230 or the other electronic device 240 of FIG. 2. The electronic device 400 may be a device capable of operating as a wireless power transmission device (e.g., the wireless power transmission device 101 of FIG. 1) or as a wireless power reception device (e.g., the wireless power reception device 103 of FIG. 1).

Referring to FIG. 4, the electronic device 400 may include a coil 401, a power conversion circuit 402, a converter 403, a charger 404, a battery 405, a controller 406, and a motion sensor 407.

The controller 406 (e.g., the processor 320 of FIG. 3) of FIG. 4 may be a micro controlling unit (MCU), a field programmable gate array (FPGA), an application specific integrated circuit (ASIC), a microprocessor, or an application processor (AP). The operation of the electronic device 400 may be controlled by the controller 406. The operation of the electronic device 400 may be understood as the operation of the controller 406.

The converter 403 may be a DC-DC conversion circuit. For example, the converter 403 may be configured to perform a DC/DC power conversion operation. The implementation method of the converter 403 is not limited. According to an embodiment, the converter 403 may operate as a transmission converter. The transmission converter may be a converter used for an operation related to transmission of wireless power when the electronic device 400 (e.g., the electronic device 230) transmits wireless power. The converter 403 may convert the voltage of the received power and provide the converted voltage to the power conversion circuit 402. The converter 403 may change the voltage of the received DC power and provide the DC power having the changed voltage (or driving voltage) to the power conversion circuit 402. The converter 403 may perform low drop-output (LDO) conversion. The converter 403 may be implemented as a converter that operates as a switch. The converter 403 may be a linear regulator operating even at a low potential difference between both the ends of the converter 403. The converter 403 may include a diode and a transistor (e.g., a field effect transistor (FET)). According to an embodiment, the converter 403 may operate as a reception converter. The reception converter may be a converter used for an operation related to reception of wireless power when the electronic device 400 (e.g., the electronic device 230) receives wireless power.

The power conversion circuit 402 may be an AC-DC conversion circuit. For example, the power conversion circuit 402 may be configured to perform an AC/DC power conversion operation. The power conversion circuit 402 may be connected to the converter 403. According to an embodiment, when the electronic device 400 transmits wireless power, the power conversion circuit 402 may operate as an inverter that converts direct current into alternating current. For example, AC power may be output using the driving voltage provided from the converter 403. The plurality of switches included in the power conversion circuit 402 may constitute, e.g., a full bridge circuit, but the number of switches or the type of bridge circuit is not limited. For example, when a full bridge circuit is configured, one end of the coil 401 may be connected to a connection point between a pair of switches through a capacitor, and the other end of the coil 401 may be connected to a connection point between the other pair of switches. A plurality of switches (e.g., the first switch, the second switch, the third switch, and the fourth switch) included in the power conversion circuit 402 may be controlled in an on state or an off state. For example, in order to generate AC power, the controller 406 may control the first switch and the third switch in the on state while controlling the second switch and the fourth switch in the off state during a first period, and may control the second switch and the fourth switch in the on state while controlling the first switch and the third switch in the off state during a second period, and may repeatedly perform the above-described control operations. The controller 406 may provide a control signal for generating the above-described AC power to the plurality of switches included in the power conversion circuit 402. Here, not only outputting the control signal but also refraining from outputting the control signal may be referred to as control of the controller 406. For example, outputting the first control signal for generating AC power having a first frequency to the power conversion circuit 402 may mean that the controller 406 outputs a control signal for controlling the first switch and the third switch in the on state for a period corresponding to the first frequency, then outputs a control signal for controlling a second switch and a fourth switch in the on state for a period corresponding to the first frequency, and repeats the above-described output operations. Meanwhile, outputting the second control signal for generating the AC power having the second frequency to the power conversion circuit 402 may mean that the controller 406 outputs a control signal control signal for controlling the first switch and the third switch in the on state for the period corresponding to the second frequency, then outputs a control signal control signal for controlling the second switch and the fourth switch in the on state for the period corresponding to the second frequency, and repeats the above-described output operations. In this case, the period corresponding to the second frequency may be different from the period corresponding to the first frequency. The controller 406 may control at least one of the converter 403 or the power conversion circuit 402 to apply power to the coil 401. According to an embodiment, when the electronic device 400 (e.g., the electronic device 230) receives wireless power, the power conversion circuit 402 may operate as a rectifier that converts AC into DC.

AC power generated by the power conversion circuit 402 may be applied to the coil 401. The coil 401 may be connected to the power conversion circuit 402. The coil 401, together with a capacitor, may form a resonant circuit. The coil 401 may form a magnetic field based on the applied AC power. As the magnetic field passing through the cross section of the coil 401 is changed over time, an induced electromotive force (e.g., current, voltage, or power) may be induced around the coil 401. The power conversion circuit 402 may output DC power according to the induced electromotive force induced in the coil 401. The power conversion circuit 402 may operate as a rectifier. The electronic device 400 (e.g., the controller 406) may identify the output voltage Vrect output from the power conversion circuit 402 to the converter 403.

At least a portion of the charger 404 may perform buck conversion and/or boost conversion and, for example, the charger 404 may include a 3-level converter. The charger 404 may perform boost conversion and supply power to the power conversion circuit 402. The charger 404 may perform a first conversion operation, and the converter 403 may perform a second conversion operation. The charger 404 may provide power for charging the battery 405 using the power provided from the converter 403. The battery 405 may receive charging power from the charger 404.

The motion sensor 407 may be a sensor for identifying the motion of the electronic device 400. The controller 406 may identify a motion variation in the electronic device 400 using the motion sensor 407. The controller 406 may identify whether the electronic device 400 is in a stationary state in which the motion variation in the electronic device 400 is 0 or in a moving state in which the motion variation in the electronic device 400 exceeds 0, using the motion sensor 407. The implementation method of the motion sensor 407 is not limited.

According to an embodiment, the electronic device 400 may include a demodulation circuit. The demodulation circuit may demodulate a signal (e.g., a voltage applied to two opposite ends of the coil 401) applied to the coil 401 to output a demodulation signal. For example, the demodulation circuit may include a mixer and/or a multiplier circuit for removing a carrier component (e.g., 100 kHz to 210 kHz, which is the frequency of AC power) for wireless power transmission. The demodulation circuit may additionally filter (low pass filtering) and output the demodulation signal. The demodulation circuit may include a low-pass filter.

Figure 5:
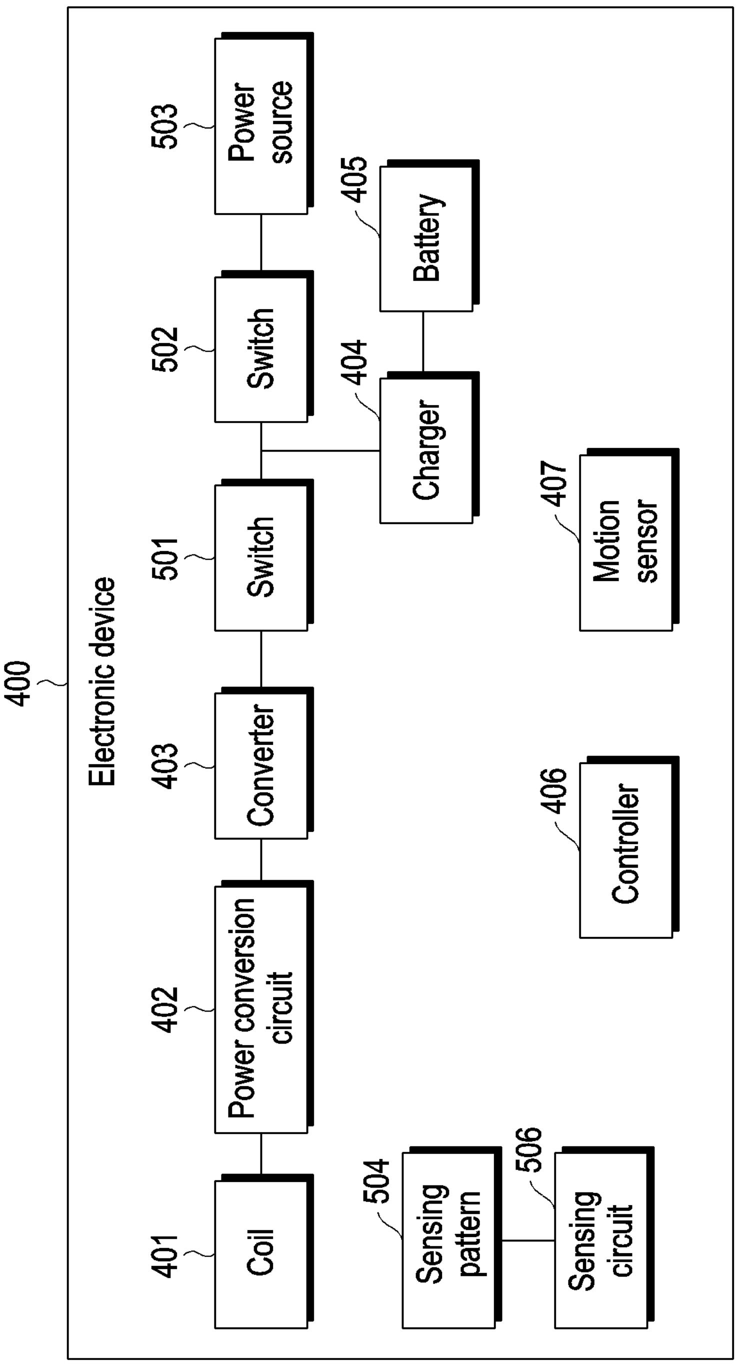
FIG. 5 is a block diagram illustrating an electronic device included in a wireless power transmission system according to an embodiment of the disclosure.

FIG. 5 is a block diagram illustrating an electronic device included in a wireless power transmission system according to an embodiment of the disclosure. FIG. 5 may be described with reference to FIGS. 4 and 6.

Figure 6:
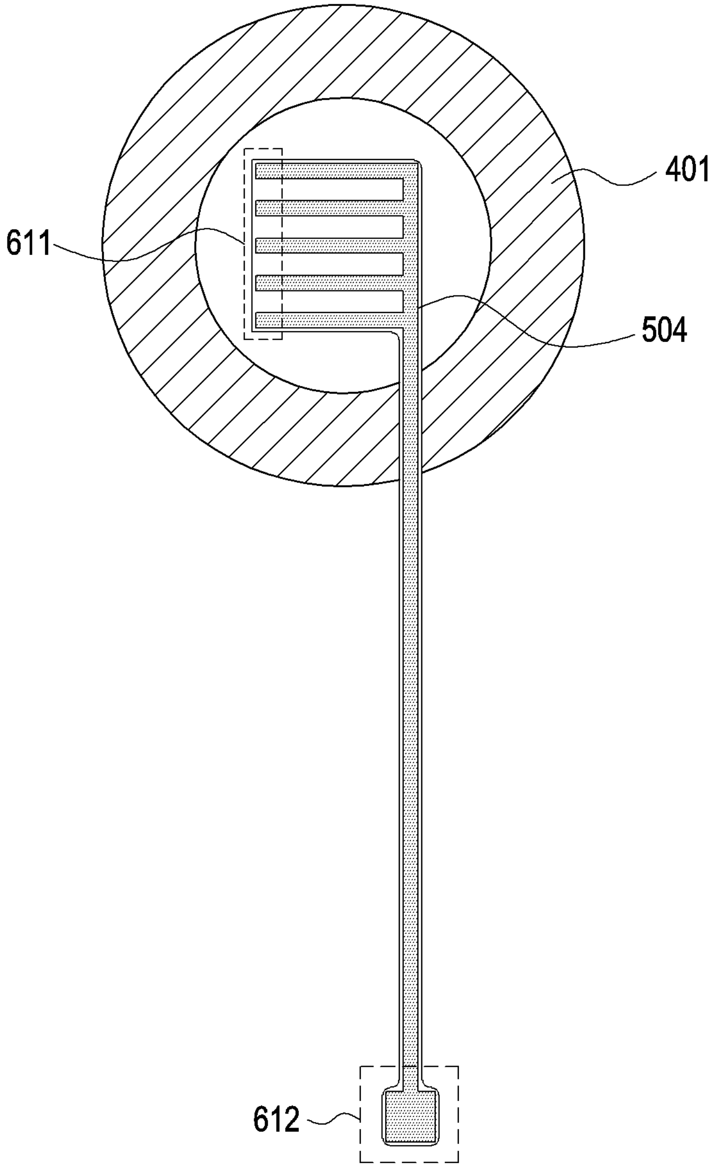
FIG. 6 is a view illustrating a sensing pattern of an electronic device according to an embodiment of the disclosure.

FIG. 6 is a view illustrating a sensing pattern of an electronic device according to an embodiment of the disclosure.

Referring to FIG. 5, in addition to the configuration of FIG. 4, the electronic device 400 may include at least one of a first switch 501, a second switch 502, a power source 503, a sensing pattern 504, or a sensing circuit 506.

For example, power provided by the power source 503 of the electronic device 400 may be provided to the converter 403. The power source 503 may include at least one of an interface for connection with an external travel adapter (TA) or a power management integrated circuit (PMIC). The power source 503 may provide, e.g., DC power to the converter 403, but the type of power provided is not limited.

The first switch 501 and the second switch 502 may be implemented as bidirectional switches, but the implementation method of the first switch 501 and the second switch 502 is not limited. For example, each of the first switch 501 and the second switch 502 may include two diodes.

The first switch 501 may be connected to the converter 403. A first end of the converter 403 may be connected to the power conversion circuit 402, and a second end of the converter 403 may be connected to the first switch 501. The controller 406 may control the flow of current in the electronic device 400 by controlling the first switch 501. For example, when the first switch 501 is turned on in a first direction (e.g., the direction output from the converter 403), the power output from the converter 403 may pass through the first switch 501, but the power input to the converter 403 may not pass through the first switch 501. When the first switch 501 is turned on in a second direction (e.g., the direction input to the converter 403), the power output from the converter 403 may not pass through the first switch 501, but the power input to the converter 403 may pass through the first switch 501. The controller 406 may control the first switch 501 to be turned off in both the directions.

The second switch 502 may be connected to the power source 503. The controller 406 may control the flow of current in the electronic device 400 by controlling the second switch 502. For example, when the second switch 502 is turned on in the first direction (e.g., the direction input to the power source 503), the power output from the power source 503 may not pass through the second switch 502, but the power input to the power source 503 may pass through the second switch 502. When the second switch 502 is turned on in the second direction (e.g., the direction output from the power source 503), the power output from the power source 503 may pass through the second switch 502, but the power input to the power source 503 may not pass through the second switch 502. The controller 406 may control the second switch 502 to be turned off in both the directions.

The electronic device 400 may identify an impedance variation due to an approach or mounting of an external object (e.g., the wireless power transmission device 210, the wireless power reception device 220, or the other electronic device 240) using the sensing pattern 504 disposed in the area where the coil 401 is positioned. The controller 406 may apply designated power to the sensing pattern 504. For example, the controller 406 may continuously or periodically apply designated power to the sensing pattern 504.

Referring to FIG. 6, the sensing pattern 504 may have a specific form that does not affect wirelessly transmitting power by the electronic device 400. The sensing pattern 504 may include an open loop or a single ended coil. One point (e.g., 612 of FIG. 6) with respect to an end point of the sensing pattern 504 may be connected to the controller 406 (or the sensing circuit 506), and at least one other point (e.g., 611 of FIG. 6) may not be connected to the controller 406 (or the sensing circuit 506). An end point (e.g., 611 of FIG. 6) of the sensing pattern 504 not connected to the controller 406 (or the sensing circuit 506) may be in an open state.

Referring to FIG. 6, the sensing pattern 504 may have a specific pattern that does not affect wirelessly transmitting power by the electronic device 400. The sensing pattern 504 may include a coil having a lattice-shaped pattern on the substrate. The specific pattern of the sensing pattern 504 disclosed in FIG. 6 is an embodiment, and the pattern of the sensing pattern 504 is not limited to the embodiment of FIG. 6. The sensing pattern 504 may include a plurality of layers (or coils having a plurality of layers) disposed on different layers with respect to the substrate. The plurality of layers (or coils having a plurality of layers) may be disposed to form a lattice-shaped pattern. Each of the plurality of layers (or coils having a plurality of layers) may be electrically connected through one point of the substrate.

Referring to FIG. 6, the sensing pattern 504 may be disposed at a position that does not affect wirelessly transmitting power by the electronic device 400. The sensing pattern 504 may be positioned in the central area of the area where the coil 401 is disposed. The sensing pattern 504 may be disposed in an empty central space inside the coil 401 so as not to overlap the coil 401. At least a portion of the sensing pattern 504 may overlap the coil 401. Referring to FIG. 6, when one point (e.g., 612 of FIG. 6) with respect to the end point of the sensing pattern 504 is present outside the area where the coil 401 is disposed, at least a portion of the sensing pattern 504 may overlap the coil 401. In the sensing pattern 504, the portion overlapping the coil 401 may be positioned on the opposite side in the radiation direction of the coil 401. For example, when the radiation direction of the coil 401 faces outward of the housing, the coil 401 may be positioned between the portion overlapping the coil 401 in the sensing pattern 504 and the housing. When one point (e.g., 612 of FIG. 6) with respect to the end point of the sensing pattern 504 is present in the central area of the area where the coil 401 is disposed, the sensing pattern 504 and the coil 401 may not overlap each other. The sensing pattern 504 may be connected to the controller 406 (or the sensing circuit 506) through another layer in the central area of the area where the coil 401 is disposed.

The sensing circuit 506 may identify the impedance value between the sensing pattern 504 and the external object as the external object approaches or contacts (or mounts) the electronic device 400. The sensing circuit 506 may transmit information about the identified impedance value (an impedance value or an impedance variation) to the controller 406.

The controller 406 may determine whether to transmit a ping signal based on the information about the impedance value. The controller 406 may compare the impedance variation corresponding to the impedance change with a designated reference value. The controller 406 may determine whether to transmit a ping signal based on the comparison between the impedance variation and the reference value. For example, the impedance variation may refer to a difference between the impedance value identified in a state in which an external object does not approaches or is not mounted on the electronic device 400 and the impedance value identified in a state in which an external object approaches or is mounted on the electronic device 400.

The controller 406 may transmit a ping signal (or ping energy) only when the impedance variation in the area where the coil 401 is positioned is larger than the reference value, thereby reducing the consumption of standby power of the electronic device 400.

At least some of the operations of the electronic device 400 described below may be performed by the controller 406. However, for convenience of description, it may be described that the electronic device 400 performs the corresponding operations.

Figure 7:
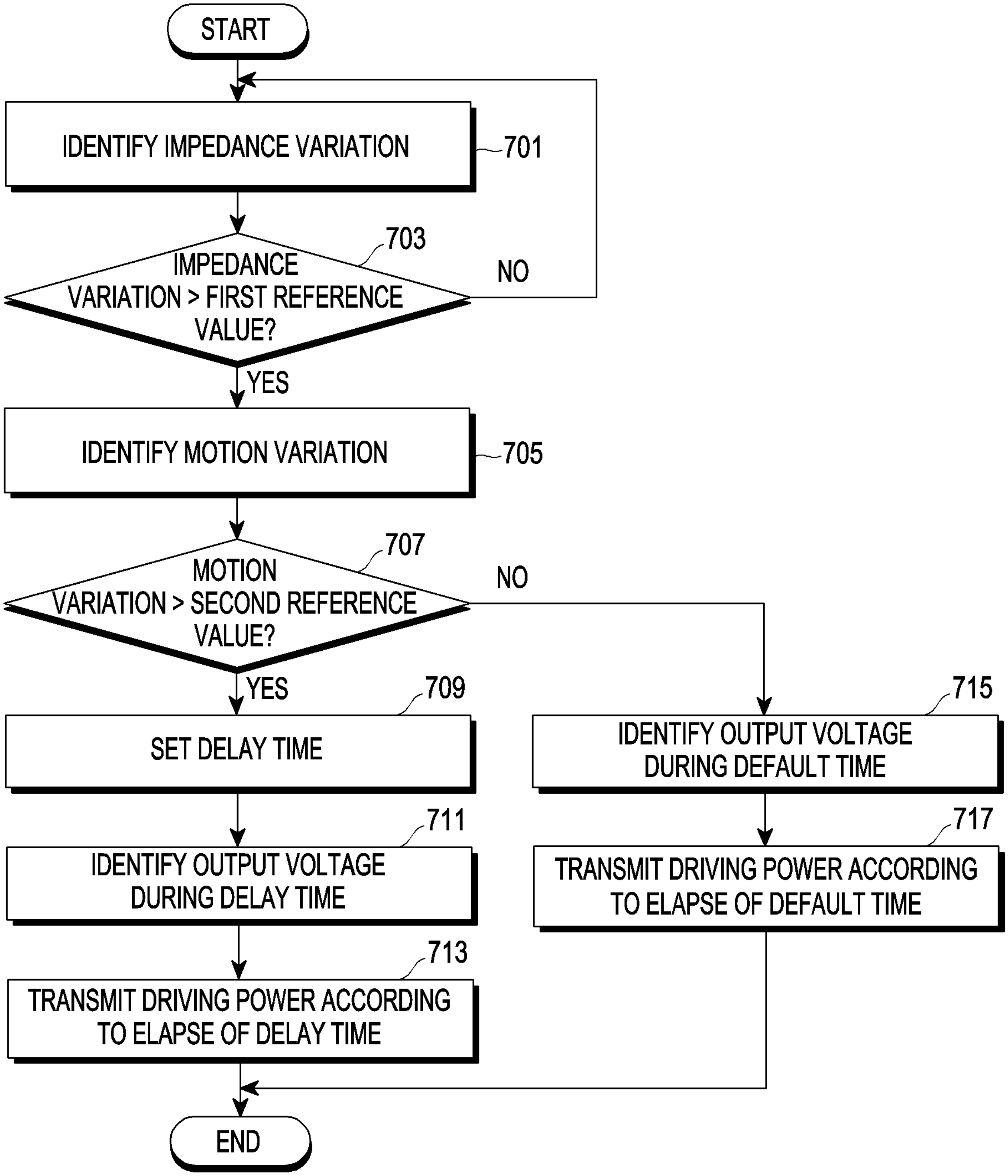
FIG. 7 is a flowchart illustrating an operation method of an electronic device according to an embodiment of the disclosure.

FIG. 7 is a flowchart illustrating an operation method of an electronic device according to an embodiment of the disclosure. FIG. 7 may be described with reference to FIGS. 4, 5, and 6.

At least some of the operations of FIG. 7 may be omitted. The operation order of the operations of FIG. 7 may be changed. Operations other than the operations of FIG. 7 may be performed before, while, or after performing the operations of FIG. 7.

Referring to FIG. 7, in operation 701, according to an embodiment, the electronic device 400 (e.g., the controller 406) may identify an impedance variation at at least one point in the electronic device 400. The electronic device 400 may identify the impedance variation in the coil 401. The electronic device 400 may identify the impedance variation in the sensing pattern 504 through the sensing circuit 506. The electronic device 400 may identify the impedance variation at at least one point in the electronic device 400 in a reception mode. The reception mode may be a mode in which the electronic device 400 operates as a wireless power reception device. The reception mode is described below with reference to FIG. 8.

In operation 703, according to an embodiment, the electronic device 400 (e.g., the controller 406) may compare the impedance variation at at least one point in the electronic device 400 with a reference value (e.g., a first reference value). The electronic device 400 may transmit a ping signal (or ping energy) only when the impedance variation at at least one point (e.g., in the area where the coil 401 is positioned) meets a designated condition, thereby reducing the consumption of standby power of the electronic device 400. When the impedance variation at at least one point in the electronic device 400 is less than or equal to the first reference value, the electronic device 400 may not transmit the ping signal. For example, when the impedance variation at at least one point in the electronic device 400 is less than or equal to the first reference value, the electronic device 400 may identify the impedance variation continuously or periodically. The electronic device 400 may transmit a ping signal according to a designated condition, based on the impedance variation at at least one point in the electronic device 400 exceeding the first reference value.

In operation 705, according to an embodiment, the electronic device 400 (e.g., the controller 406) may identify a motion variation in the electronic device 400. The electronic device 400 may identify the motion variation in the electronic device 400 through the motion sensor 407. The electronic device 400 may identify the motion variation in the electronic device 400 through the motion sensor 407 based on the impedance variation at at least one point in the electronic device 400 exceeding the first reference value. The electronic device 400 may identify the motion variation before identifying the impedance variation, while identifying the impedance variation, or after identifying the impedance variation.

In operation 707, according to an embodiment, the electronic device 400 (e.g., the controller 406) may compare the motion variation in the electronic device 400 with a reference value (e.g., a second reference value).

In operation 709, according to an embodiment, the electronic device 400 (e.g., the controller 406) may set a delay time based on the motion variation (e.g., the motion variation identified in operation 705) in the electronic device 400 exceeding the second reference value (e.g., the second reference value in operation 707). The "delay time" may be a period of time from a time when a designated condition (e.g., impedance variation>first reference value, and motion variation>second reference value) is met until the electronic device 400 transmits initial driving power (e.g., a ping signal) through the coil 401. The delay time may be set to longer than a default time. The "default time" may be a time from a time when a designated condition (e.g., impedance variation>first reference value, and motion variation≤second reference value) is met until the electronic device 400 transmits the initial driving power (e.g., a ping signal) through the coil 401. The default time is further described in operation 715. For example, when the default time (e.g., 550 ms) is applied to the electronic device 400, the electronic device 400 may transmit the initial driving power (e.g., a ping signal) according to the elapse of the default time (e.g., 550 ms), and when the delay time (e.g., 650 m) is applied to the electronic device 400, the electronic device 400 may transmit the initial driving power (e.g., a ping signal) according to the elapse of the delay time (e.g., 650 m). The "driving power (e.g., a ping signal)" may be power for driving an electronic device (e.g., the wireless power reception device 220 or another electronic device 240) around the electronic device 400. The electronic device (e.g., the wireless power reception device 220 or the other electronic device 240) around the electronic device 400 may drive at least one internal component (e.g., at least one communication module for in-band communication or out-band communication) by receiving driving power (e.g., a ping signal) transmitted from the electronic device 400.

An example of setting the delay time is as follows. However, the method of setting the delay time is not limited to the following example.

According to an embodiment, the electronic device 400 may determine the delay time based on the motion variation in the electronic device 400. When the motion variation in the electronic device 400 exceeds the reference value (e.g., the second reference value), the electronic device 400 may determine the delay time based on the motion variation in the electronic device 400. When the motion variation in the electronic device 400 is A (e.g., 50) exceeding the second reference value (e.g., 30), and when the motion variation in the electronic device 400 is B (e.g., 90) exceeding the second reference value (e.g., 30), the electronic device 400 may calculate different delay times. For example, when the motion variation is relatively large, the electronic device 400 may set the delay time to be longer than when the motion variation is relatively small. For example, the electronic device 400 may determine the delay time based on an equation (e.g., Equation 1) including the motion variation (e.g., 0 to 100), but the form of the equation is not limited.

$$\text{Delay time}=a+b*MC\ [\text{ms}],\ (MC=\text{motion variation},\ a \text{ and } b=\text{positive real numbers}) \quad \text{Equation 1}$$

The electronic device 400 may determine the delay time based on the charging level of the battery 405 of the electronic device 400. When the motion variation in the electronic device 400 exceeds the reference value (e.g., the second reference value), the electronic device 400 may determine the delay time based on the charging level of the battery 405 of the electronic device 400. The "charging level" may be a ratio of the remaining charge amount to the total capacity. Alternatively, the "charging level" may be the remaining charge amount. For example, when the total capacity of the battery 405 is 3000 [mAh] and the remaining charge amount of the battery 405 is 1500 [mAh], the charging level of the battery 405 may mean 50[%] or 1500 [mAh]. Hereinafter, it is described that the charging level is a ratio of the remaining charge amount to the total capacity, but it is understood similarly even when the charging level is the remaining charge amount. When the motion variation in the electronic device 400 exceeds the reference value (e.g., the second reference value), the electronic device 400 may identify the charging level of the battery 405 and determine the delay time based on the charging level of the battery 405. When the charging level of the battery 405 is C (e.g., 40[%]) and the charging level of the battery 405 is D (e.g., 80[%]), the electronic device 400 may calculate different delay times. For example, when the charging level is relatively high, the electronic device 400 may set the delay time to be shorter than when the charging level is relatively low. For example, the electronic device 400 may determine the delay time based on an equation (e.g., Equation 2) including the charging level (e.g., 0 to 100[%]), but the form of the equation is not limited.

$$\text{Delay time}=c-d*CL\ [\text{ms}],\ (CL=\text{charging Level},\ c \text{ and } d=\text{positive real numbers}) \quad \text{Equation 2}$$

The electronic device 400 may determine the delay time based on the motion variation in the electronic device 400 and the charging level of the battery 405 of the electronic device 400. When the motion variation in the electronic device 400 exceeds the reference value (e.g., the second reference value), the electronic device 400 may determine the delay time based on the motion variation in the electronic device 400 and the charging level of the battery 405 of the electronic device 400. For example, when the motion variation is relatively large, the electronic device 400 may set the delay time to be longer than when the motion variation is relatively small, and when the charging level is relatively high, the electronic device 400 may set the delay time to be shorter than when the charging level is relatively low. For example, the electronic device 400 may determine the delay time based on an equation (e.g., Equation 3) including the motion variation (e.g., 0 to 100) and the charging level (e.g., 0 to 100[%]), but the form of the equation is not limited.

$$\text{Delay time}=f+g*MC-h*CL\ [\text{ms}],\ (MC=\text{motion variation},\ CL=\text{charging level},\ f,\ g, \text{ and } h=\text{positive real numbers}) \quad \text{Equation 3}$$

In operation 711, according to an embodiment, the electronic device 400 (e.g., the controller 406) may identify the output voltage Vrect provided from the power conversion circuit 402 to the converter 403 during the delay time (e.g., the delay time set in operation 709). The identification of the output voltage is described with reference to FIG. 8.

In operation 713, according to an embodiment, the electronic device 400 (e.g., the controller 406) may transmit driving power through the coil 401 according to the elapse of the delay time without detecting a designated event (e.g., identifying that the output voltage Vrect exceeds the reference voltage or receiving a packet from the outside). The designated event and transmission of driving power are described with reference to FIG. 8.

In operation 715, according to an embodiment, the electronic device 400 (e.g., the controller 406) may identify the output voltage Vrect provided from the power conversion circuit 402 to the converter 403 for the default time, based on the motion variation (e.g., the motion variation identified in operation 705) in the electronic device 400 being less than or equal to the second reference value (e.g., the second reference value in operation 707). The identification of the output voltage is described with reference to FIG. 8. As described above, the default time may be a time from a time when a designated condition (e.g., impedance variation>first reference value, and motion variation≤second reference value) is met until the electronic device 400 transmits the initial driving power (e.g., a ping signal) through the coil 401.

The default time may be predesignated. The default time may be designated as 0 [s]. The default time may be set to 550 [ms]. However, there is no limit to the scope of the default time. As the default time is designated as a time exceeding 0 [s], the electronic device 400 may identify the output voltage Vrect provided from the power conversion circuit 402 to the converter 403 before transmitting the driving power (e.g., a ping signal) in operation 717.

The default time may be changed according to the state of the electronic device 400. For example, the electronic device 400 may change the default time according to the charging level of the battery 405. For example, based on the charging level of the battery 405 exceeding the reference value (e.g., a third reference value), the electronic device 400 may change the default time to a time shorter than the previously set time. For example, the electronic device 400 may change the default time based on an equation including the charging level of the battery 405, but the form of the equation is not limited. The electronic device 400 may maintain the default time as the previously set time regardless of the state of the electronic device 400.

In operation 717, according to an embodiment, the electronic device 400 (e.g., the controller 406) may transmit driving power through the coil 401 according to the elapse of the default time without detecting a designated event (e.g., identifying that the output voltage Vrect exceeds the reference voltage or receiving a packet from the outside). The designated event and transmission of driving power are described with reference to FIG. 8.

Figure 8:
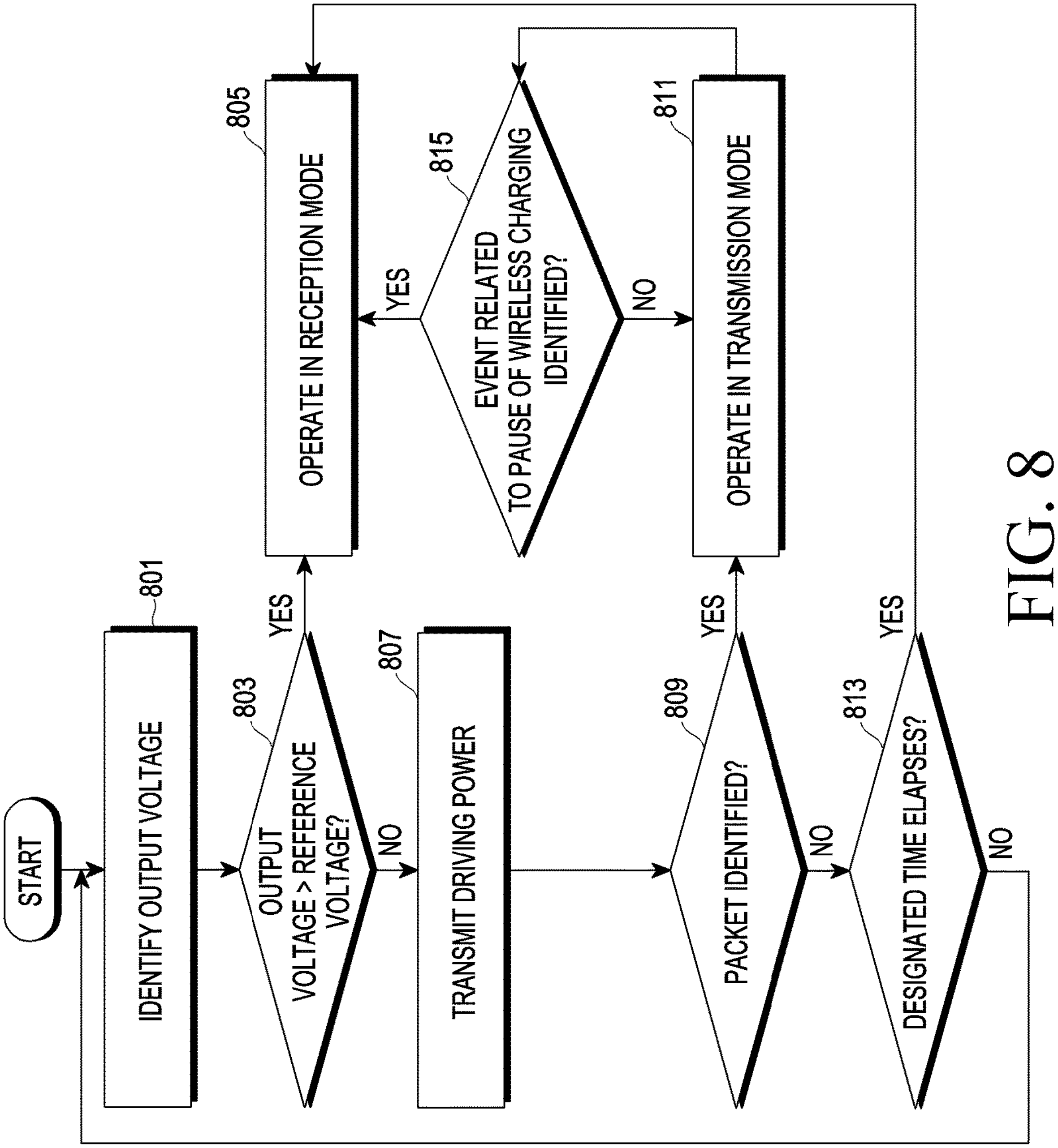
FIG. 8 is a flowchart illustrating an operation method of an electronic device according to an embodiment of the disclosure.

FIG. 8 is a flowchart illustrating an operation method of an electronic device according to an embodiment of the disclosure. FIG. 8 may be described with reference to FIGS. 4, 5, 6, and 7.

At least some of the operations of FIG. 8 may be omitted. The operation order of the operations of FIG. 8 may be changed. Operations other than the operations of FIG. 8 may be performed before, while, or after performing the operations of FIG. 8.

At least some of the operations of FIG. 7 and at least some of the operations of FIG. 8 may be organically connected and applied. Some of the operations of FIG. 7 may not be performed. Some of the operations of FIG. 8 may not be performed. Some of the operations of FIG. 8 may be performed between the operations of FIG. 7, or some of the operations of FIG. 7 may be performed between the operations of FIG. 8. Some of the operations of FIG. 8 may correspond to some of the operations of FIG. 7.

Referring to FIG. 8, in operation 801, according to an embodiment, the electronic device 400 (e.g., the controller 406) may identify an output voltage Vrect provided from the power conversion circuit 402 to the converter 403. For example, in operation 711 of FIG. 7, the electronic device 400 may identify an output voltage Vrect provided from the power conversion circuit 402 to the converter 403. The electronic device 400 may identify the output voltage Vrect provided from the power conversion circuit 402 to the converter 403 during the delay time. For example, in operation 715 of FIG. 7, the electronic device 400 may identify an output voltage Vrect provided from the power conversion circuit 402 to the converter 403. The electronic device 400 may identify the output voltage Vrect provided from the power conversion circuit 402 to the converter 403 during the default time.

In operation 803, according to an embodiment, the electronic device 400 (e.g., the controller 406) may compare the output voltage (e.g., the output voltage identified in operation 801) provided from the power conversion circuit 402 to the converter 403 with the reference voltage.

In operation 805, according to an embodiment, the electronic device 400 (e.g., the controller 406) may operate in the reception mode based on the output voltage (e.g., the output voltage identified in operation 801) provided from the power conversion circuit 402 to the converter 403 exceeding the reference voltage.

The "reception mode" may be a mode in which the electronic device 400 operates as a wireless power reception device. The electronic device 400 may wirelessly receive power from an external device (e.g., the wireless power transmission device 210 or the other electronic device 240) in the reception mode. In the reception mode, the electronic device 400 may identify the output voltage provided from the power conversion circuit 402 to the converter 403. In the reception mode, the electronic device 400 may control the first switch 501 to be turned on in the first direction (e.g., the direction output from the converter 403). In the reception mode, the electronic device 400 may charge the battery 405 based on the power received from an external device (e.g., the wireless power transmission device 210 or the other electronic device 240). In the reception mode, the electronic device 400 may transmit information about the output voltage provided from the power conversion circuit 402 to the converter 403 to the external device (e.g., the wireless power transmission device 210 or the other electronic device 240). In the reception mode, the electronic device 400 may transmit a signal (or packet) indicating that power is received from the external device (e.g., the wireless power transmission device 210 or the other electronic device 240) to the external device (e.g., the wireless power transmission device 210 or the other electronic device 240). In the reception mode, the electronic device 400 may transmit information about the magnitude of power received from the external device (e.g., the wireless power transmission device 210 or the other electronic device 240) to the external device (e.g., the wireless power transmission device 210 or the other electronic device 240). The electronic device 400 may perform operation 701 of FIG. 7 in the reception mode.

In operation 807, according to an embodiment, the electronic device 400 (e.g., the controller 406) may transmit driving power through the coil 401 based on maintaining the state in which the output voltage (e.g., the output voltage identified in operation 801) provided from the power conversion circuit 402 to the converter 403 is equal to or less than the reference voltage for a designated time (e.g., the default time of operation 715 of FIG. 7, the delay time of operation 711, or a set time interval described below). For example, in operation 713 of FIG. 7, the electronic device 400 may transmit driving power through the coil 401 according to the elapse of the delay time in the state in which the output voltage (e.g., the output voltage identified in operation 801) provided from the power conversion circuit 402 to the converter 403 is less than or equal to the reference voltage. For example, in operation 717 of FIG. 7, the electronic device 400 may transmit driving power through the coil 401 according to the elapse of the default time in the state in which the output voltage (e.g., the output voltage identified in operation 801) provided from the power conversion circuit 402 to the converter 403 is equal to or less than the reference voltage.

In operation 809, according to an embodiment, the electronic device 400 (e.g., the controller 406) may identify whether a packet is received from the outside by transmitting driving power. For example, as the electronic device 400 transmits the driving power, the electronic device 400 may identify whether a packet is received from the outside according to the in-band scheme. For example, as the electronic device 400 transmits the driving power, the electronic device 400 may identify whether a packet is received from the outside according to the out-band scheme. The electronic device 400 may receive a packet (e.g., a signal strength packet) indicating that power has been received from the external device (e.g., the wireless power reception device 220 or the other electronic device 240) from the external device (e.g., the wireless power reception device 220 or the other electronic device 240).

In operation 811, according to an embodiment, as the driving power is transmitted, the electronic device 400 (e.g., the controller 406) may operate in the transmission mode based on reception of a packet (e.g., the packet of operation 809) from the outside.

The "transmission mode" may be a mode in which the electronic device 400 operates as a wireless power transmission device. The electronic device 400 may wirelessly transmit power to the external device (e.g., the wireless power transmission device 210 or the other electronic device 240) in the transmission mode. The electronic device 400 may transmit driving power through the coil 401 in the transmission mode. In the transmission mode, the electronic device 400 may control the first switch 501 to be turned on in the second direction (e.g., the direction input to the converter 403). In the transmission mode, the electronic device 400 may transmit power to the external device (e.g., the wireless power reception device 220 or the other electronic device 240) through the coil 401, based on the power provided from the battery 405. In the transmission mode, the electronic device 400 may control the second switch 502 to be turned on in the second direction (e.g., the direction output from the power source 503). In the transmission mode, the electronic device 400 may transmit power to the external device (e.g., the wireless power reception device 220 or the other electronic device 240) through the coil 401, based on the power provided from the power source 503.

In operation 813, according to an embodiment, the electronic device 400 (e.g., the controller 406) may identify whether the designated time (e.g., a selection time) has elapsed in the state in which the packet (e.g., the packet in operation 809) is not identified from the outside. The designated time (e.g., the selection time) may be a time given for the electronic device 400 to select whether to operate in the reception mode or the transmission mode. The designated time (e.g., the selection time) may be a time counted from the time when the impedance variation at at least one point in the electronic device 400 exceeds the reference value (e.g., the first reference value) in operation 703 of FIG. 7, but the time of the designated time (e.g., the selection time) is not limited.

According to an embodiment, the electronic device 400 (e.g., the controller 406) may perform operation 805 (e.g., the operation in the reception mode) according to the elapse of the designated time (e.g., the duration of the selection mode) in the state in which the packet (e.g., the packet in operation 809) is not identified from the outside.

According to an embodiment, the electronic device 400 (e.g., the controller 406) may perform operation 801 as the designated time (e.g., the duration of the selection mode) does not elapse in the state in which the packet (e.g., the packet of operation 809) is not identified from the outside. When the electronic device 400 performs operation 801 without detecting a designated event (e.g., identifying that the output voltage Vrect exceeds the reference voltage or receiving a packet from the outside) after transmitting the driving power, the electronic device 400 may identify the output voltage provided from the power conversion circuit 402 to the converter 403 during a set time interval (e.g., 550 [ms]).

In operation 815, according to an embodiment, the electronic device 400 (e.g., the controller 406) may identify whether an event related to pause of wireless charging occurs in the transmission mode. The "event related to the pause of wireless charging" may include an occurrence of a control error packet (CEP) timeout, a charging complete event, and a charging level of the battery 405 falling below the reference value. There is no limitation on the type of event related to the pause of wireless charging. In the transmission mode, the electronic device 400 may operate in the reception mode of operation 805 based on identifying the event related to the pause of wireless charging. In the transmission mode, the electronic device 400 may continue to operate in the transmission mode based on failure to identify the event related to the pause of wireless charging.

Referring to FIG. 8, the electronic device 400 may repeatedly perform the operation of identifying the output voltage provided from the power conversion circuit 402 to the converter 403 and the operation of transmitting driving power through the coil 401, thereby determining whether to operate in the transmission mode or the reception mode. For example, after transmitting driving power through the coil 401 for a designated period (duration), the electronic device 400 may identify the output voltage provided from the power conversion circuit 402 to the converter 403 for a set time interval (e.g., 550 [ms]), and may repeatedly perform such an operation.

Figure 9:
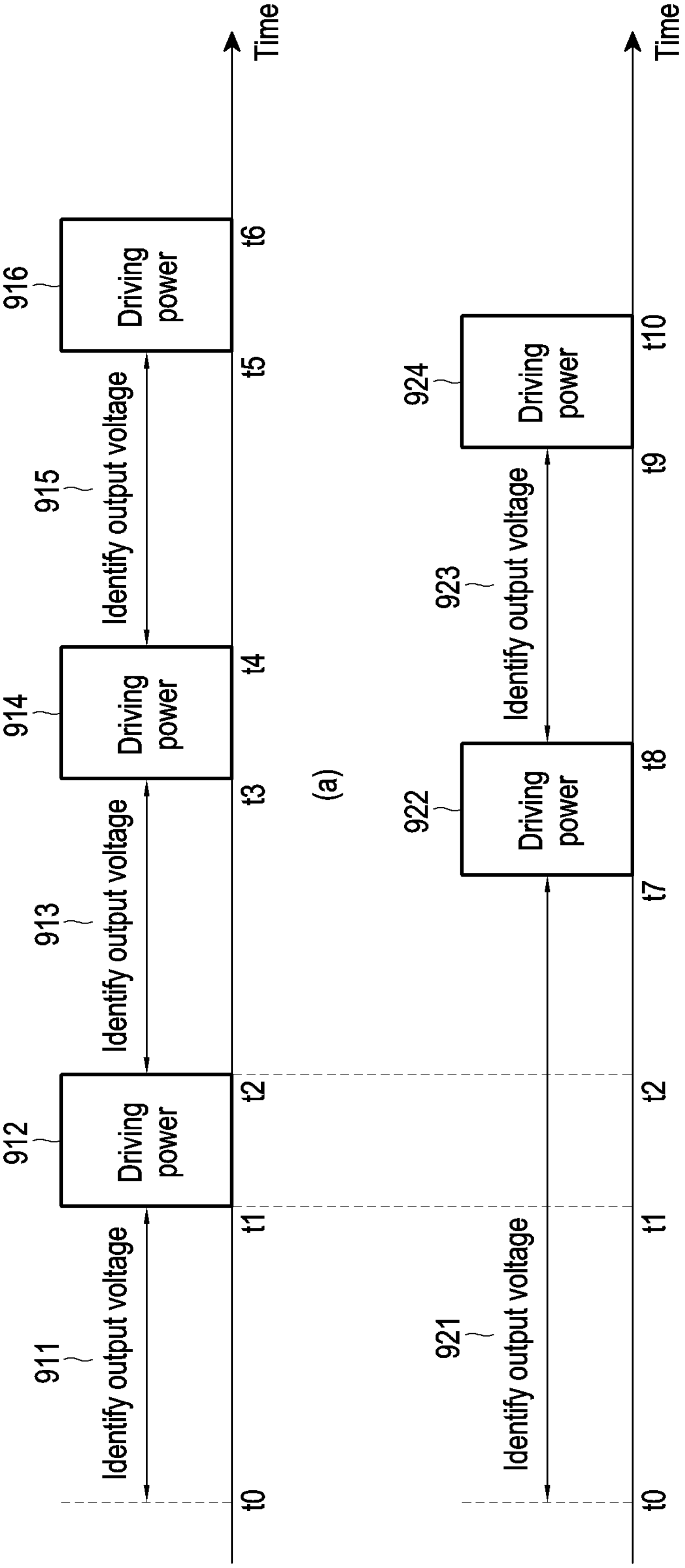
FIG. 9 is a view illustrating operations of an electronic device according to an embodiment of the disclosure.

FIG. 9 is a view illustrating operations of an electronic device according to an embodiment of the disclosure.

Referring to FIG. 9, a default time and a delay time may be understood.

Part (a) of FIG. 9 illustrates an embodiment of transmitting initial driving power 912 according to the elapse of a default time t0 to t1.

Referring to part (a) of FIG. 9, in operation 715 of FIG. 7, the electronic device 400 may identify the output voltage Vrect output from the power conversion circuit 402 to the converter 403 during a default time t0 to t1 (911). For example, the operation in which the electronic device 400 identifies the output voltage Vrect output from the power conversion circuit 402 to the converter 403 during the default time t0 to t1 may be performed based on a designated condition (e.g., impedance variation>first reference value, and motion variation≤second reference value). In operation 717 of FIG. 7, the electronic device 400 may transmit the driving power 912 through the coil 401 according to the elapse of the default time t0 to t1 without detecting a designated event (e.g., identifying that the output voltage Vrect exceeds the reference voltage or receiving a packet from the outside). As the transmission mode or the reception mode is not determined, the electronic device 400 may repeat identification 913 and 915 of the output voltage and transmission 914 and 916 of the driving power as shown in part (a) of FIG. 9. In operations 911, 913, and 915 of identifying the output voltage in by the electronic device 400 in part (a) of FIG. 9, the time allocated to 913 and 915 and the time allocated to 911 may be the same as or different from each other.

Part (b) of FIG. 9 illustrates an embodiment of transmitting initial driving power (e.g., 922) according to the elapse of a delay time (e.g., t0 to t7) longer than the default time (e.g., t0 to t1).

Referring to part (b) of FIG. 9, in operation 711 of FIG. 7, the electronic device 400 may identify the output voltage Vrect output from the power conversion circuit 402 to the converter 403 during the delay time t0 to t7 (921). For example, the operation in which the electronic device 400 identifies the output voltage Vrect output from the power conversion circuit 402 to the converter 403 during the delay time t0 to t7 may be performed based on a designated condition (e.g., impedance variation>first reference value, and motion variation>second reference value). In operation 713 of FIG. 7, the electronic device 400 may transmit driving power through the coil 401 according to the elapse of the delay time t0 to t7 without detecting a designated event (e.g., identifying that the output voltage Vrect exceeds the reference voltage or receiving a packet from the outside). As the transmission mode or the reception mode is not determined, the electronic device 400 may repeat identification 923 of the output voltage and transmission 924 of the driving power as shown in part (b) of FIG. 9. In operations 921 and 923 of identifying the output voltage by the electronic device 400 in part (b) of FIG. 9, the time allocated to 921 and the time allocated to 923 may be the same as or different from each other.

A case in which the electronic device 400 (e.g., the electronic device 230 of FIG. 2) operates as shown in part (a) of FIG. 9 and another electronic device (e.g., the other electronic device 240 of FIG. 2) operates as shown in part (b) of FIG. 9 in a state in which the electronic device 400 (e.g., the electronic device 230 of FIG. 2) and the electronic device (e.g., the other electronic device 240 of FIG. 2) are close to each other is described below.

In FIG. 9, the other electronic device (e.g., the other electronic device 240 in FIG. 2) may have a high probability of operating in the reception mode as it receives the driving power 912 transmitted from the electronic device 400 (e.g., the electronic device 230 in FIG. 2). For example, the other electronic device (e.g., the other electronic device 240 of FIG. 2) may operate in the reception mode by receiving the driving power 912 transmitted from the electronic device 400 (e.g., the electronic device 230 of FIG. 2). The electronic device 400 (e.g., the electronic device 230 of FIG. 2) may have a high probability of operating in the transmission mode as the other electronic device (e.g., the other electronic device 240 of FIG. 2) operates in the reception mode so that it receives a packet (e.g., a packet corresponding to the driving power 912 transmitted by the electronic device 400) transmitted from the other electronic device (e.g., the other electronic device 240 of FIG. 2). For example, the electronic device 400 (e.g., the electronic device 230 of FIG. 2) may operate in the transmission mode as the other electronic device (e.g., the other electronic device 240 of FIG. 2) operates in the reception mode so that it receives a packet transmitted from the other electronic device (e.g., the other electronic device 240 of FIG. 2). Accordingly, the electronic device 400 (e.g., the electronic device 230 of FIG. 2) may wirelessly transmit power to the other electronic device (e.g., the other electronic device 240 of FIG. 2). The other electronic device (e.g., the other electronic device 240 of FIG. 2) may wirelessly receive power from the electronic device 400 (e.g., the electronic device 230 of FIG. 2).

Figure 10:
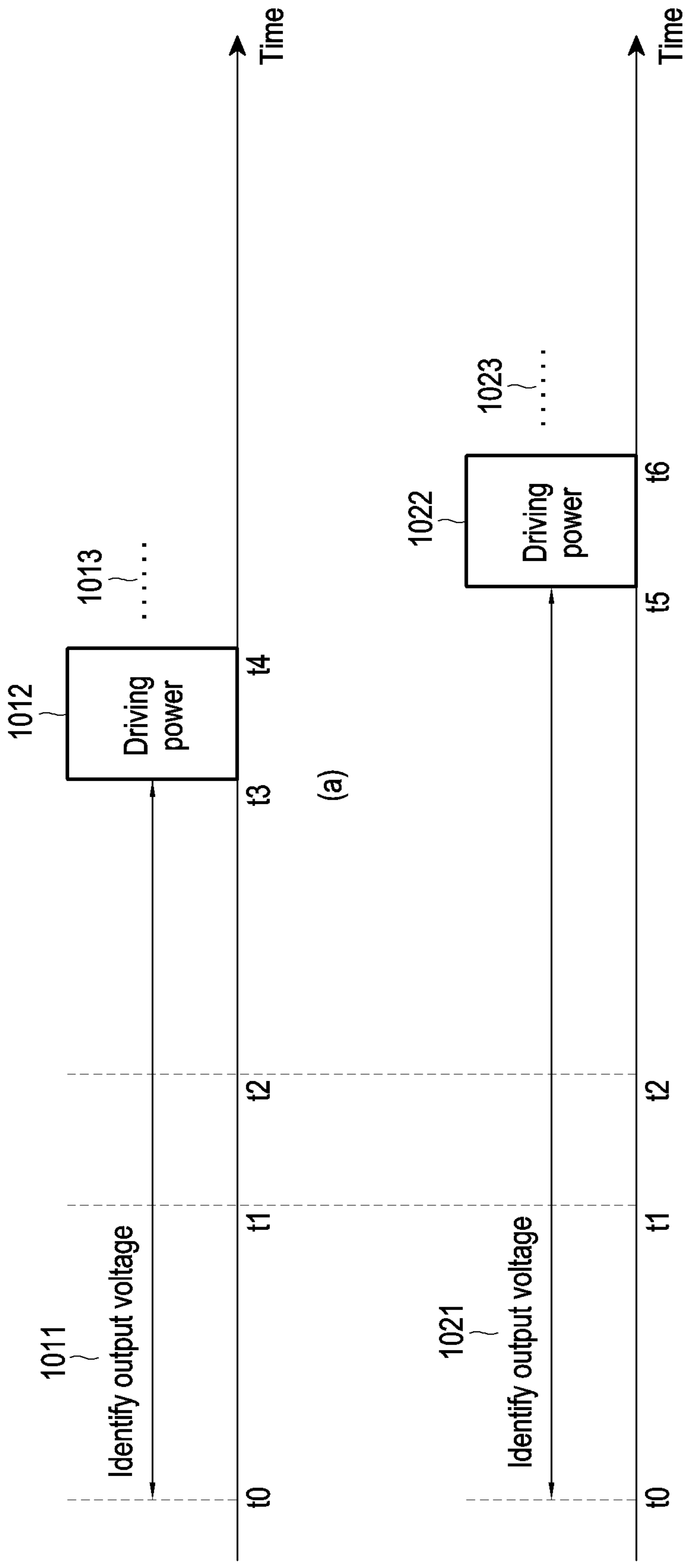
FIG. 10 is a view illustrating operations of an electronic device according to an embodiment of the disclosure.

FIG. 10 is a view illustrating operations of an electronic device according to an embodiment of the disclosure.

Referring to FIG. 10, a difference in delay time may be understood.

Part (a) of FIG. 10 illustrates an embodiment of transmitting initial driving power 1012 as a first delay time t0 to t3 longer than a default time (e.g., t0 to t1) elapses.

Referring to part (a) of FIG. 10, in operation 711 of FIG. 7, the electronic device 400 may identify the output voltage Vrect output from the power conversion circuit 402 to the converter 403 during a first delay time t0 to t3 (1011). In operation 713 of FIG. 7, the electronic device 400 may transmit the driving power 1012 through the coil 401 according to the elapse of the first delay time t0 to t3 without detecting a designated event (e.g., identifying that the output voltage Vrect exceeds the reference voltage or receiving a packet from the outside). As the transmission mode or the reception mode is not determined, the electronic device 400 may repeat (1013) the operation (e.g., 1011) of identifying the output voltage and the operation (e.g., 1012) of transmitting the driving power as shown in part (a) of FIG. 10.

Part (b) of FIG. 10 illustrates an embodiment of transmitting initial driving power (e.g., 1022) as a second delay time (e.g., t0 to t5) longer than a default time (e.g., t0 to t1) elapses.

Referring to part (b) of FIG. 10, in operation 711 of FIG. 7, the electronic device 400 may identify the output voltage Vrect output from the power conversion circuit 402 to the converter 403 during a second delay time (e.g., t0 to t5) (1021). In operation 713 of FIG. 7, the electronic device 400 may transmit the driving power 1022 through the coil 401 according to the elapse of the second delay time (e.g., t0 to t5) without detecting a designated event (e.g., identifying that the output voltage Vrect exceeds the reference voltage or receiving a packet from the outside). As the transmission mode or the reception mode is not determined, the electronic device 400 may repeat (1023) the operation (e.g., 1021) of identifying the output voltage and the operation of transmitting the driving power (e.g., 1022) as shown in part (b) of FIG. 10.

A case in which the electronic device 400 (e.g., the electronic device 230 of FIG. 2) operates as shown in part (a) of FIG. 10 and the other electronic device (e.g., the other electronic device 240 of FIG. 2) operates as shown in part (b) of FIG. 10 in a state in which the electronic device 400 (e.g., the electronic device 230 of FIG. 2) and the other electronic device (e.g., the other electronic device 240 of FIG. 2) are close to each other is described below.

In FIG. 10, the other electronic device (e.g., the other electronic device 240 in FIG. 2) has a high probability of operating in the reception mode as it receives the driving power 1012 transmitted from the electronic device 400 (e.g., the electronic device 230 in FIG. 2). For example, the other electronic device (e.g., the other electronic device 240 of FIG. 2) may operate in the reception mode by receiving the driving power 1012 transmitted from the electronic device 400 (e.g., the electronic device 230 of FIG. 2). The electronic device 400 (e.g., the electronic device 230 of FIG. 2) may have a high probability of operating in the transmission mode as the other electronic device (e.g., the other electronic device 240 of FIG. 2) operates in the reception mode so that it receives a packet (e.g., a packet corresponding to the driving power 1012 transmitted by the electronic device 400) transmitted from the other electronic device (e.g., the other electronic device 240 of FIG. 2). For example, the electronic device 400 (e.g., the electronic device 230 of FIG. 2) may operate in the transmission mode as the other electronic device (e.g., the other electronic device 240 of FIG. 2) operates in the reception mode so that it receives a packet transmitted from the other electronic device (e.g., the other electronic device 240 of FIG. 2). Accordingly, the electronic device 400 (e.g., the electronic device 230 of FIG. 2) may wirelessly transmit power to the other electronic device (e.g., the other electronic device 240 of FIG. 2). The other electronic device (e.g., the other electronic device 240 of FIG. 2) may wirelessly receive power from the electronic device 400 (e.g., the electronic device 230 of FIG. 2).

It may be understood by one of ordinary skill in the art that various embodiments described herein may be applied mutually organically within the applicable scope. For example, one of ordinary skill in the art may understand that at least some operations of an embodiment of the disclosure may be omitted and applied and that at least some operations of an embodiment and at least some operations of another embodiment may be organically combined and applied.

According to an embodiment, an electronic device 230; 301; 400 may comprise a converter 403 configured to perform a DC/DC power conversion operation, a power conversion circuit 402 electrically or operatively connected to the converter 403 and configured to perform an AC/DC power conversion operation, a coil 401 electrically or operatively connected to the power conversion circuit 402, a motion sensor 407 configured to detect a motion of the electronic device 230; 301; 400, and a controller 406 operatively connected to the converter 403, the power conversion circuit 402, or the motion sensor 407. The controller 406 may be configured to identify an impedance variation at at least one point in the electronic device 230; 301; 400. The controller 406 may be configured to identify a motion variation in the electronic device 230; 301; 400 through the motion sensor 407 based on the impedance variation exceeding a first reference value. The controller 406 may be configured to set a delay time based on the motion variation exceeding a second reference value. The controller 406 may be configured to transmit first driving power to an external electronic device 210; 220; 240; 302 through the coil 401 according to an elapse of the delay time.

According to an embodiment, the controller 406 may be configured to determine the delay time according to the motion variation.

According to an embodiment, the electronic device 230; 301; 400 may further comprise a battery 405 operatively connected to the controller 406. The controller 406 may be configured to identify a charging level of the battery 405. The controller 406 may be configured to determine the delay time according to the charging level.

According to an embodiment, the controller 406 may be configured to identify an output voltage provided from the power conversion circuit 402 to the converter 403 during the delay time.

According to an embodiment, the controller 406 may be configured to control the electronic device 230; 301; 400 to operate in a reception mode, based on the output voltage exceeding a reference voltage.

According to an embodiment, the controller 406 may be configured to identify an output voltage provided from the power conversion circuit 402 to the converter 403 during a first time interval after transmitting the first driving power. The controller 406 may be configured to control the electronic device 230; 301; 400 to operate in a reception mode, based on the output voltage exceeding a reference voltage.

According to an embodiment, the controller 406 may be configured to transmit second driving power to an external electronic device 210, 220, 240, 302 through the coil 401 based on maintaining a state in which the output voltage is the reference voltage or less during the first time interval after transmitting the first driving power. The controller 406 may be configured to identify the output voltage provided from the power conversion circuit 402 to the converter 403 during the first time interval after transmitting the second driving power.

According to an embodiment, the controller 406 may be configured to repeat transmitting the driving power and identifying the output voltage, based on maintaining the state in which the output voltage is the reference voltage or less during the first time interval after transmitting the second driving power. The controller 406 may be configured to control the electronic device 230; 301; 400 to operate in a reception mode, based on whether a mode of the electronic device 230; 301; 400 is a transmission mode or the reception mode not being determined, for a designated time from a time when the first driving power is transmitted.

According to an embodiment, the controller 406 may be configured to transmit the first driving power to the external electronic device 210; 220; 240; 302 through the coil 401 according to an elapse of a default time, based on the motion variation being the second reference value or less.

According to an embodiment, the controller 406 may be configured to identify an output voltage provided from the power conversion circuit 402 to the converter 403 for the default time. The controller 406 may be configured to control the electronic device 230, 301, 400 to operate in a reception mode, based on the output voltage exceeding a reference voltage.

According to an embodiment, the controller 406 may be configured to control the electronic device 230; 301; 400 to operate in a transmission mode, based on identifying a packet provided from the external electronic device 220; 240; 302 according to the transmission of the first driving power.

According to an embodiment, the controller 406 may be configured to control the electronic device 230; 301; 400 to operate in a reception mode, based on identifying an event related to pause of wireless charging, after controlling the electronic device 230; 301; 400 to operate in a transmission mode.

According to an embodiment, the electronic device 230; 301; 400 may further comprise a sensing pattern 504 disposed in a central portion of the coil 401 and a sensing circuit 506 configured to detect an impedance variation in the sensing pattern 504. The controller 406 may be configured to identify the impedance variation in the sensing pattern 504 as the impedance variation at the at least one point through the sensing circuit 506.

According to an embodiment, a first end of the converter 403 may be connected to the power conversion circuit 402. The electronic device 230; 301; 400 may further comprise a first switch 501 connected to a second end of the converter 403. The controller 406 may be configured to control the first switch 501 according to whether the electronic device 230; 301; 400 operates in a transmission mode or a reception mode.

According to an embodiment, a method for operating an electronic device 230; 301; 400 may comprise identifying an impedance variation at at least one point in the electronic device 230; 301; 400. The method may comprise identifying a motion variation in the electronic device 230; 301; 400 through a motion sensor 407 of the electronic device 230; 301; 400 based on the impedance variation exceeding a first reference value. The method may comprise setting a delay time based on the motion variation exceeding a second reference value. The method may comprise transmitting first driving power to an external electronic device 210; 220; 240; 302 through a coil 401 of the electronic device 230; 301; 400 according to an elapse of the delay time.

According to an embodiment, setting the delay time may include determining the delay time according to the motion variation.

According to an embodiment, setting the delay time may include identifying the charging level of the battery 405 of the electronic device 230; 301; 400. Setting the delay time may include determining the delay time according to the charging level.

According to an embodiment, the method may comprise identifying an output voltage provided from a power conversion circuit 402 of the electronic device 230; 301; 400 to a converter 403 of the electronic device 230; 301; 400 during the delay time. The method may comprise operating in a reception mode based on the output voltage exceeding a reference voltage.

According to an embodiment, the method may comprise identifying an output voltage provided from a power conversion circuit 402 of the electronic device 230; 301; 400 to a converter 403 of the electronic device 230; 301; 400 during a first time interval after transmitting the first driving power. The method may comprise operating in a reception mode based on the output voltage exceeding a reference voltage.

According to an embodiment, the method may comprise transmitting second driving power to an external electronic device 210; 220; 240; 302 through the coil 401 based on maintaining a state in which the output voltage is the reference voltage or less during the first time interval after transmitting the first driving power. The method may comprise identifying the output voltage provided from the power conversion circuit 402 to the converter 403 during the first time interval after transmitting the second driving power.

According to an embodiment, the method may comprise repeating transmitting the driving power and identifying the output voltage, based on maintaining the state in which the output voltage is the reference voltage or less during the first time interval after transmitting the second driving power. The method may comprise controlling the electronic device 230; 301; 400 to operate in a reception mode, based on whether a mode of the electronic device 230; 301; 400 is a transmission mode or the reception mode not being determined, for a designated time from a time when the first driving power is transmitted.

According to an embodiment, the method may comprise transmitting the first driving power to the external electronic device 210; 220; 240; 302 through the coil 401 according to an elapse of a default time, based on the motion variation being the second reference value or less.

According to an embodiment, the method may comprise identifying an output voltage provided from the power conversion circuit 402 to the converter 403 for the default time. The method may comprise controlling the electronic device 230; 301; 400 to operate in a reception mode, based on the output voltage exceeding a reference voltage.

According to an embodiment, the method may comprise controlling the electronic device 230; 301; 400 to operate in a transmission mode, based on identifying a packet provided from the external electronic device 220; 240; 302 according to the transmission of the first driving power.

According to an embodiment, the method may comprise controlling the electronic device 230; 301; 400 to operate in a reception mode, based on identifying an event related to pause of wireless charging, after controlling the electronic device 230; 301; 400 to operate in a transmission mode.

According to an embodiment, the method may comprise identifying the impedance variation in a sensing pattern 504 of the electronic device 230; 301; 400 as the impedance variation at the at least one point through a sensing circuit 506 of the electronic device 230; 301; 400.

According to an embodiment, a first end of the converter 403 may be connected to the power conversion circuit 402. The electronic device 230; 301; 400 may further comprise a first switch 501 connected to a second end of the converter 403. The method may comprise controlling the first switch 501 according to whether the electronic device 230; 301; 400 operates in a transmission mode or a reception mode.

According to an embodiment, in a computer-readable recording medium storing instructions configured to perform at least one operation by a controller 406 of an electronic device 230; 301; 400, the at least one operation may comprise identifying an impedance variation at at least one point in the electronic device 230; 301; 400. The at least one operation may comprise identifying a motion variation in the electronic device 230; 301; 400 through a motion sensor 407 of the electronic device 230; 301; 400 based on the impedance variation exceeding a first reference value. The at least one operation may comprise setting a delay time based on the motion variation exceeding a second reference value. The at least one operation may comprise transmitting first driving power to an external electronic device 210; 220; 240; 302 through a coil 401 of the electronic device 230; 301; 400 according to an elapse of the delay time.

According to an embodiment, setting the delay time may include determining the delay time according to the motion variation.

According to an embodiment, setting the delay time may include identifying the charging level of the battery 405 of the electronic device 230; 301; 400. Setting the delay time may include determining the delay time according to the charging level.

According to an embodiment, the at least one operation may comprise identifying an output voltage provided from a power conversion circuit 402 of the electronic device 230; 301; 400 to a converter 403 of the electronic device 230; 301; 400 during the delay time. The at least one operation may comprise operating in a reception mode based on the output voltage exceeding a reference voltage.

According to an embodiment, the at least one operation may comprise identifying an output voltage provided from a power conversion circuit 402 of the electronic device 230; 301; 400 to a converter 403 of the electronic device 230; 301; 400 during a first time interval after transmitting the first driving power. The at least one operation may comprise operating in a reception mode based on the output voltage exceeding a reference voltage.

According to an embodiment, the at least one operation may comprise transmitting second driving power to an external electronic device 210; 220; 240; 302 through the coil 401 based on maintaining a state in which the output voltage is the reference voltage or less during the first time interval after transmitting the first driving power. The at least one operation may comprise identifying the output voltage provided from the power conversion circuit 402 to the converter 403 during the first time interval after transmitting the second driving power.

According to an embodiment, the at least one operation may comprise repeating transmitting the driving power and identifying the output voltage, based on maintaining the state in which the output voltage is the reference voltage or less during the first time interval after transmitting the second driving power. The at least one operation may comprise controlling the electronic device 230; 301; 400 to operate in a reception mode, based on whether a mode of the electronic device 230; 301; 400 is a transmission mode or the reception mode not being determined, for a designated time from a time when the first driving power is transmitted.

According to an embodiment, the at least one operation may comprise transmitting the first driving power to the external electronic device 210; 220; 240; 302 through the coil 401 according to an elapse of a default time, based on the motion variation being the second reference value or less.

According to an embodiment, the at least one operation may comprise identifying an output voltage provided from the power conversion circuit 402 to the converter 403 for the default time. The at least one operation may comprise controlling the electronic device 230; 301; 400 to operate in a reception mode, based on the output voltage exceeding a reference voltage.

According to an embodiment, the at least one operation may comprise controlling the electronic device 230; 301; 400 to operate in a transmission mode, based on identifying a packet provided from the external electronic device 220; 240; 302 according to the transmission of the first driving power.

According to an embodiment, the at least one operation may comprise controlling the electronic device 230; 301; 400 to operate in a reception mode, based on identifying an event related to pause of wireless charging, after controlling the electronic device 230; 301; 400 to operate in a transmission mode.

According to an embodiment, the at least one operation may comprise identifying the impedance variation in a sensing pattern 504 of the electronic device 230; 301; 400 as the impedance variation at the at least one point through a sensing circuit 506 of the electronic device 230; 301; 400.

According to an embodiment, a first end of the converter 403 may be connected to the power conversion circuit 402. The electronic device 230; 301; 400 may further comprise a first switch 501 connected to a second end of the converter 403. The at least one operation may comprise controlling the first switch 501 according to whether the electronic device 230; 301; 400 operates in a transmission mode or a reception mode.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory 336 or external memory 338) that is readable by a machine (e.g., the wireless power transmission device 101). For example, a processor (e.g., the processor 320) of the machine (e.g., the wireless power transmission device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
- a converter configured to perform a direct current (DC)/DC power conversion operation;
- a power conversion circuit configured to perform an alternating current (AC)/DC power conversion operation;
- a coil;
- a motion sensor configured to detect a motion of the electronic device;
- memory storing a computer program; and
- a processor,
- wherein the computer program includes computer-executable instructions that, when executed by the processor individually or collectively, cause the electronic device to:
  - identify an impedance variation at at least one point in the electronic device,
  - identify a motion variation in the electronic device through the motion sensor based on the impedance variation exceeding a first reference value,
  - set a delay time to a default time when the motion variation is less than or equal to a second reference value, and set the delay time to longer than the default time when the motion variation exceeds the second reference value, and
  - transmit first driving power to an external electronic device through the coil according to an elapse of the delay time.

2. The electronic device of claim 1, wherein the computer program further includes computer-executable instructions that, when executed by the processor individually or collectively, cause the electronic device to:
- determine the delay time according to the motion variation.

3. The electronic device of claim 1, further comprising:
- a battery,
- wherein the computer program further include computer-executable instructions that, when executed by the processor individually or collectively, cause the electronic device to:
  - identify a charging level of the battery, and
  - determine the delay time according to the charging level.

4. The electronic device of claim 1, wherein the computer program further includes computer-executable instructions that, when executed by the processor individually or collectively, cause the electronic device to:
- identify an output voltage provided from the power conversion circuit to the converter during the delay time.

5. The electronic device of claim 4, wherein the computer program further includes computer-executable instructions that, when executed by the processor individually or collectively, cause the electronic device to:
- operate in a reception mode in which the electronic device is configured to wirelessly receive power from the external electronic device, based on the output voltage exceeding a reference voltage.

6. The electronic device of claim 1, wherein the computer program further includes computer-executable instructions that, when executed by the processor individually or collectively, cause the electronic device to:
- identify an output voltage provided from the power conversion circuit to the converter during a first time interval after transmitting the first driving power, and
- operate in a reception mode in which the electronic device is configured to wirelessly receive power from the external electronic device, based on the output voltage exceeding a reference voltage.

7. The electronic device of claim 6, wherein the computer program further includes computer-executable instructions that, when executed by the processor individually or collectively, cause the electronic device to:
- transmit second driving power to the external electronic device through the coil based on maintaining a state in which the output voltage is the reference voltage or less during the first time interval after transmitting the first driving power, and
- identify the output voltage provided from the power conversion circuit to the converter during the first time interval after transmitting the second driving power.

8. The electronic device of claim 7, wherein the computer program further includes computer-executable instructions that, when executed by the processor individually or collectively, cause the electronic device to:
- repeat transmitting the second driving power and identifying the output voltage, based on maintaining the state in which the output voltage is the reference voltage or less during the first time interval after transmitting the second driving power, and
- operate in a reception mode in which the electronic device is configured to wirelessly receive power from the external electronic device, based on determining a mode of the electronic device as the reception mode, operate in a transmission mode in which the electronic device is configured to wirelessly transmit power to the external electronic device, based on determining the mode of the electronic device as the transmission mode or operate in the reception mode based on the reception mode or the transmission mode not being determined, for a designated time from a time when the first driving power is transmitted.

9. The electronic device of claim 1, wherein the computer program further includes computer-executable instructions that, when executed by the processor individually or collectively, cause the electronic device to:
- transmit the first driving power to the external electronic device through the coil according to an elapse of the default time, based on the motion variation being the second reference value or less.

10. The electronic device of claim 9, wherein the computer program further includes computer-executable instructions that, when executed by the processor individually or collectively, cause the electronic device to:
- identify an output voltage provided from the power conversion circuit to the converter for the default time, and
- operate in a reception mode in which the electronic device is configured to wirelessly receive power from the external electronic device, based on the output voltage exceeding a reference voltage.

11. The electronic device of claim 1, wherein the computer program further includes computer-executable instructions that, when executed by the processor individually or collectively, cause the electronic device to:

operate in a transmission mode in which the electronic device is configured to wirelessly transmit power to the external electronic device, based on identifying a packet provided from the external electronic device according to the transmission of the first driving power.

12. The electronic device of claim 1, wherein the computer program further includes computer-executable instructions that, when executed by the processor individually or collectively, cause the electronic device to:

operate in a reception mode in which the electronic device is configured to wirelessly receive power from the external electronic device, based on identifying an event related to pause of wireless charging, after controlling the electronic device to operate in a transmission mode in which the electronic device is configured to wirelessly transmit power to the external electronic device.

13. The electronic device of claim 1, further comprising:

a sensing pattern disposed in a central portion of the coil; and a sensing circuit configured to detect an impedance variation in the sensing pattern, wherein the computer program further includes computer-executable instructions that, when executed by the processor individually or collectively, cause the electronic device to:

identify the impedance variation in the sensing pattern as the impedance variation at the at least one point through the sensing circuit.

14. The electronic device of claim 1, wherein a first end of the converter is connected to the power conversion circuit, wherein the electronic device further comprises a switch connected to a second end of the converter, and wherein the computer program further includes computer-executable instructions that, when executed by the processor individually or collectively, cause the electronic device to:

control the switch according to whether the electronic device operates in a transmission mode in which the electronic device is configured to wirelessly transmit power to the external electronic device or a reception mode in which the electronic device is configured to wirelessly receive power from the external electronic device.

15. A method performed by an electronic device, the method comprising:

identifying an impedance variation at at least one point in the electronic device;

identifying a motion variation in the electronic device through a motion sensor of the electronic device based on the impedance variation exceeding a first reference value;

setting a delay time to a default time when the motion variation is less than or equal to a second reference value, and setting the delay time to longer than the default time when the motion variation exceeds the second reference value; and transmitting first driving power to an external electronic device through a coil of the electronic device according to an elapse of the delay time.

16. The method of claim 15, further comprising:

identifying a charging level of a battery of the electronic device, and determining the delay time according to the charging level.

17. The method of claim 15, further comprising:

identifying an output voltage provided from a power conversion circuit of the electronic device to a converter of the electronic device during a first time interval after transmitting the first driving power; and controlling the electronic device to operate in a reception mode in which the electronic device is configured to wirelessly receive power from the external electronic device, based on the output voltage exceeding a reference voltage.

18. The method of claim 17, further comprising:

transmitting second driving power to the external electronic device through the coil based on maintaining a state in which the output voltage is the reference voltage or less during the first time interval after transmitting the first driving power; and identify the output voltage provided from the power conversion circuit to the converter during the first time interval after transmitting the second driving power.

19. One or more non-transitory computer-readable storage media storing one ore more computer programs including computer-executable instructions that, when executed by one or more processors of an electronic device individually or collectively, cause the electronic device to perform operations, the operations comprising:

identifying an impedance variation at at least one point in the electronic device;

identifying a motion variation in the electronic device through a motion sensor of the electronic device based on the impedance variation exceeding a first reference value;

setting a delay time to a default time when the motion variation is less than or equal to a second reference value, and setting the delay time to longer than the default time when the motion variation exceeds the second reference value; and transmitting first driving power to an external electronic device through a coil of the electronic device according to an elapse of the delay time.

20. The one or more non-transitory computer-readable storage media of claim 19, the operations further comprising:

identifying a charging level of a battery of the electronic device, and determining the delay time according to the charging level.

* * * * *